United States Patent
Lyden et al.

(10) Patent No.: US 10,025,276 B2
(45) Date of Patent: Jul. 17, 2018

(54) CONTROL TECHNIQUES FOR MOTOR DRIVEN SYSTEMS

(71) Applicant: Analog Devices, Inc., Norwood, MA (US)

(72) Inventors: Colin Lyden, Baltimore (IE); Javier Calpe-Maravilla, Algemesi (ES); Mark Murphy, Kilmore (IE); Eoin English, Pallasgreen (IE); Denis Martin O'Connor, Banteer (IE); Tudor Vinereanu, Cork City (IE); Alan Cahill, Edinburgh (GB); Sean Brennan, Adare (IE)

(73) Assignee: ANALOG DEVICES, INC., Norwood, MA (US)

( * ) Notice: Subject to any disclaimer, the term of this patent is extended or adjusted under 35 U.S.C. 154(b) by 853 days.

(21) Appl. No.: 14/303,896

(22) Filed: Jun. 13, 2014

(65) Prior Publication Data

US 2014/0292249 A1    Oct. 2, 2014

Related U.S. Application Data

(60) Division of application No. 12/572,559, filed on Oct. 2, 2009, now Pat. No. 8,766,565, which is a
(Continued)

(51) Int. Cl.
*H02P 5/00*    (2016.01)
*H02N 2/00*    (2006.01)
(Continued)

(52) U.S. Cl.
CPC ............... *G05B 13/02* (2013.01); *G05B 5/01* (2013.01); *H02P 25/034* (2016.02)

(58) Field of Classification Search
CPC .......... G05B 5/01; G05B 13/02; H02P 25/034
(Continued)

(56) References Cited

U.S. PATENT DOCUMENTS

| 4,477,755 A | 10/1984 | Rickert |
| 4,649,328 A | 3/1987 | Leonard et al. |

(Continued)

FOREIGN PATENT DOCUMENTS

| CN | 1433001 A | 7/2003 |
| CN | 101091321 A | 12/2007 |

(Continued)

OTHER PUBLICATIONS

D. R. Morgan et al., A Multitone Pseudocascade Filtered-X LMS Adaptive Notch Filter:, IEEE Transactions on Signal Processing, vol. 41, No. 2, Feb. 1993, pp. 946-956.
(Continued)

*Primary Examiner* — Eduardo Colon Santana
*Assistant Examiner* — Gabriel Agared
(74) *Attorney, Agent, or Firm* — Patent Capital Group

(57) ABSTRACT

Embodiments of the present invention provide a motor-driven mechanical system with a detection system to measure properties of a back channel and derive oscillatory characteristics of the mechanical system. Uses of the detection system may include calculating the resonant frequency of the mechanical system and a threshold drive $D_{TH}$ required to move the mechanical system from the starting mechanical stop position. System manufacturers often do not know the resonant frequency and $D_{TH}$ of their mechanical systems precisely. Therefore, the calculation of the specific mechanical system's resonant frequency and $D_{TH}$ rather than depending on the manufacturer's expected values improves precision in the mechanical system use. The backchannel
(Continued)

calculations may be used either to replace or to improve corresponding pre-programmed values.

50 Claims, 20 Drawing Sheets

Related U.S. Application Data continuation-in-part of application No. 12/367,883, filed on Feb. 9, 2009, now Pat. No. 8,299,744, which is a continuation-in-part of application No. 12/367,938, filed on Feb. 9, 2009, now abandoned.

(60) Provisional application No. 61/150,958, filed on Feb. 9, 2009.

(51) Int. Cl.
    *G05B 11/01* (2006.01)
    *G05B 13/00* (2006.01)
    *G05B 11/32* (2006.01)
    *G05B 13/02* (2006.01)
    *G05B 5/01* (2006.01)
    *H02P 25/034* (2016.01)

(58) Field of Classification Search
    USPC ............... 318/114, 118, 119, 560, 561, 562
    See application file for complete search history.

(56) References Cited

U.S. PATENT DOCUMENTS

| | | | |
|---|---|---|---|
| 4,682,123 A | 7/1987 | Loper et al. | |
| 4,761,774 A | 8/1988 | Ishibashi et al. | |
| 5,200,940 A | 4/1993 | Goto et al. | |
| 5,444,479 A | 8/1995 | Fernekes et al. | |
| 5,638,267 A | 6/1997 | Singhose et al. | |
| 5,736,824 A | 4/1998 | Sato et al. | |
| 5,786,678 A | 7/1998 | Kobayashi et al. | |
| 5,796,222 A * | 8/1998 | Grodevant ......... G06K 7/10643 235/462.15 | |
| 5,796,703 A | 8/1998 | Schell et al. | |
| 5,811,954 A | 9/1998 | Randall | |
| 5,917,300 A | 6/1999 | Tanquary et al. | |
| 5,988,411 A | 11/1999 | Singer et al. | |
| 6,163,116 A | 12/2000 | Tanquary et al. | |
| 6,236,182 B1 | 5/2001 | Kerner | |
| 6,314,473 B1 | 11/2001 | Singer et al. | |
| 6,560,658 B2 | 5/2003 | Singer et al. | |
| 6,657,411 B1 * | 12/2003 | Sasaki ............... G05B 19/353 318/490 | |
| 6,829,207 B1 | 12/2004 | Singer | |
| 6,888,694 B2 | 5/2005 | Guo et al. | |
| 7,031,094 B2 | 4/2006 | Chung | |
| 7,068,923 B2 | 6/2006 | Miyazaki | |
| 7,084,958 B2 | 8/2006 | Butler | |
| 7,315,493 B2 | 1/2008 | Van Brocklin et al. | |
| 7,330,414 B2 | 2/2008 | Singer | |
| 7,433,144 B2 | 10/2008 | Singer | |
| 7,456,595 B2 | 11/2008 | Ratliff et al. | |
| 7,501,616 B2 | 3/2009 | Wiklof | |
| 7,639,232 B2 | 12/2009 | Grant et al. | |
| 7,769,110 B2 | 8/2010 | Momtaz | |
| 2003/0133218 A1 | 7/2003 | Guo et al. | |
| 2004/0090878 A1 | 5/2004 | Soma et al. | |
| 2005/0111125 A1 | 5/2005 | Chung | |
| 2005/0134562 A1 | 6/2005 | Grant et al. | |
| 2005/0169119 A1 | 8/2005 | Van Brocklin et al. | |
| 2006/0267526 A1 | 11/2006 | Nakajima | |
| 2007/0019321 A1 * | 1/2007 | Kim .................... G11B 5/5582 360/78.04 | |
| 2007/0241711 A1 | 10/2007 | Finamore et al. | |
| 2008/0056700 A1 * | 3/2008 | Toyama ................ G02B 27/40 396/114 | |
| 2008/0062143 A1 | 3/2008 | Shahoian et al. | |
| 2008/0086670 A1 | 4/2008 | Krouk et al. | |
| 2008/0106307 A1 | 5/2008 | Lee et al. | |
| 2008/0130134 A1 | 6/2008 | Ishida et al. | |
| 2008/0158406 A1 | 7/2008 | Ito | |
| 2008/0170322 A1 | 7/2008 | Konishi | |
| 2008/0246532 A1 | 10/2008 | Cosper et al. | |
| 2009/0102403 A1 | 4/2009 | Lule | |
| 2009/0222711 A1 | 9/2009 | Belogolovy | |

FOREIGN PATENT DOCUMENTS

| | | |
|---|---|---|
| EP | 0817377 A2 | 1/1998 |
| EP | 1008413 A1 | 6/2000 |
| EP | 1418663 A1 | 5/2004 |
| EP | 1441266 B1 | 3/2007 |
| FR | 2922695 A1 | 4/2009 |
| JP | 59185186 A | 10/1984 |
| JP | 63046520 A | 2/1988 |
| JP | 04249913 A | 9/1992 |
| JP | H04249913 A | 9/1992 |
| JP | H10078801 A | 3/1998 |
| JP | H11254240 A | 9/1999 |
| JP | 2001195849 A | 7/2001 |
| JP | 2003134868 A | 5/2003 |
| JP | 2004246294 A | 9/2004 |
| JP | 2005079866 A | 3/2005 |
| JP | 2005149711 A | 6/2005 |
| TW | 460868 B | 10/2001 |
| TW | 591883 B | 6/2004 |
| TW | I262647 B | 9/2006 |
| WO | 2006106909 A1 | 10/2006 |
| WO | 2007141075 A1 | 12/2007 |
| WO | 2009116453 A1 | 9/2009 |

OTHER PUBLICATIONS

AD5398: 120 mA, Current Sinking, 10-Bit, I2C® DAC. 2005 Analog Devices, Inc. www.analog.com.
AD5821: 120 mA, Current Sinking, 10-Bit, I2C® DAC. 2007 Analog Devices, Inc. www.analog.com.
AD5820: 100 mA, Current Sinking, 10-Bit, I2C DAC. 2008 Analog Devices, Inc. www.analog.com.
AD5830: VCM Driver with Shutter Assembly. 2009 Analog Devices, Inc. www.analog.com.
International Search Report and Written Opinion for PCT/US2010/022083, report dated Aug. 3, 2011.
PCT International Search Report for PCT/US2010/022117, dated Dec. 8, 2011.
Partial International Search Report dated May 2, 2012, for PCT International Application No. PCT/US2010/022110.

* cited by examiner

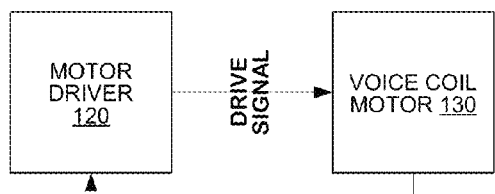
FIG. 1
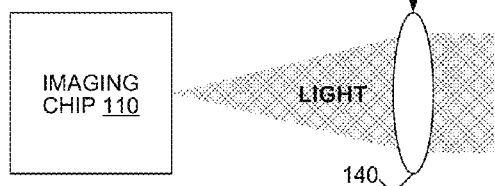
FIG. 2
RESPONSE OF
MECHANICAL SYSTEM
FIG. 3
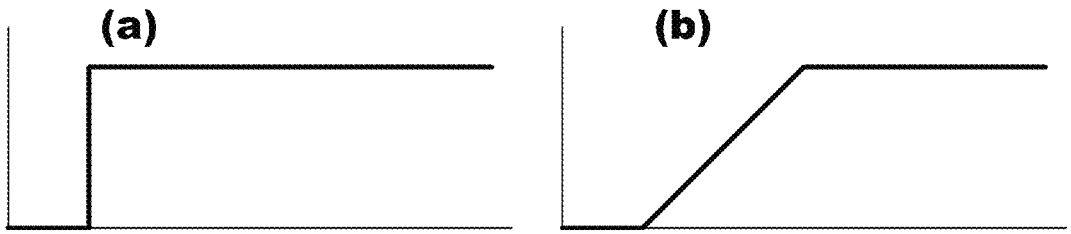

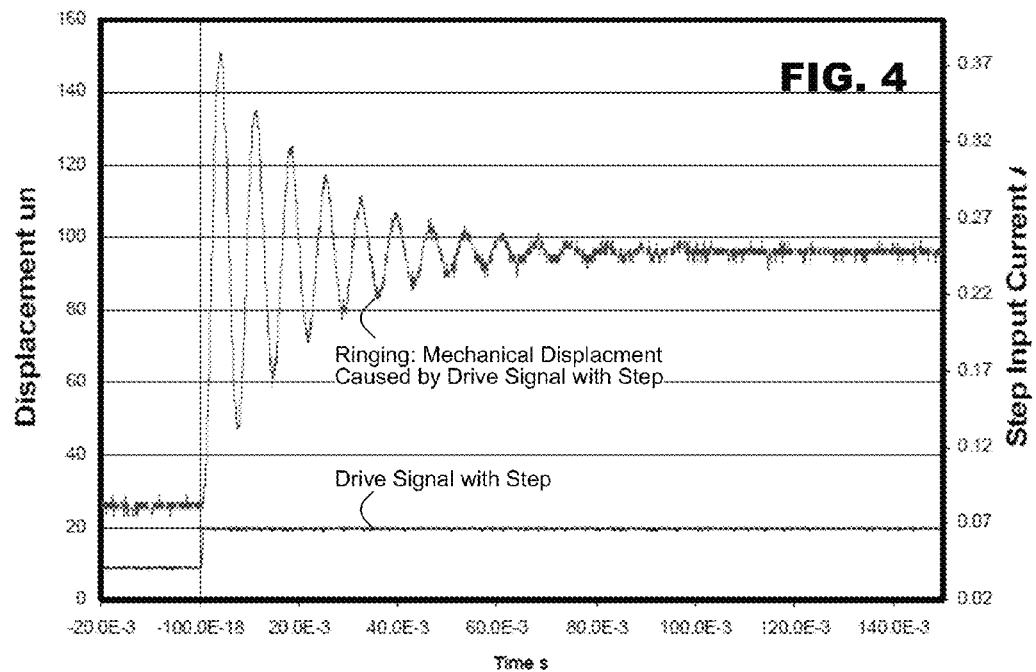
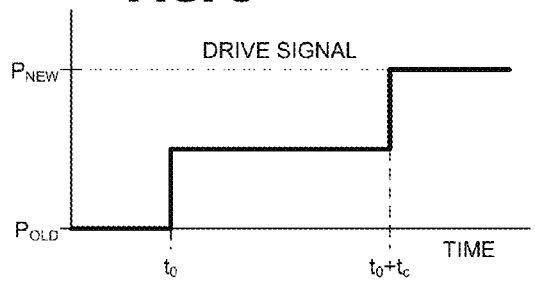 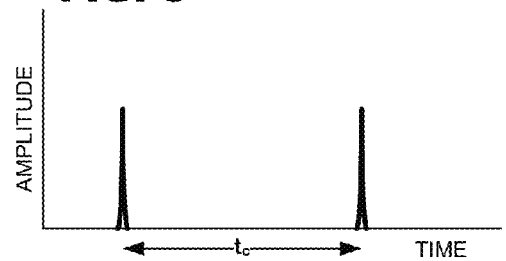
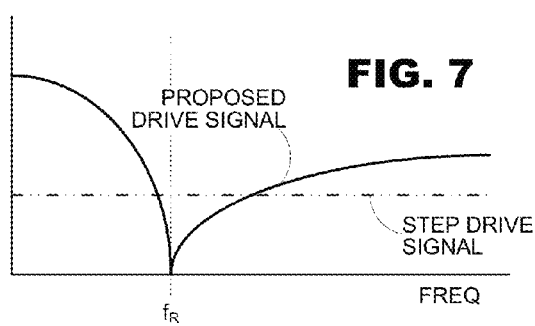

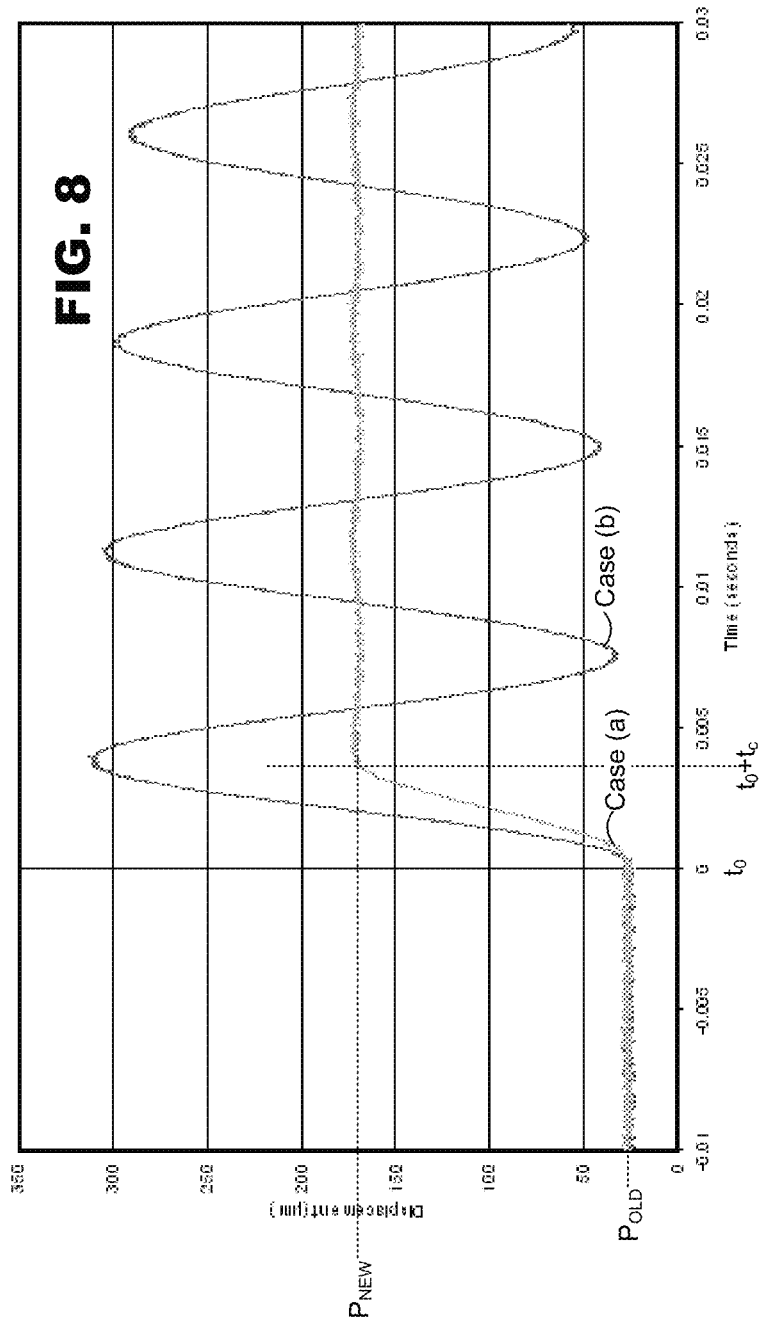

1300

1600

1700

1800

1900

2000

2100

2200

2300

2400

2500

2700

2800

2900

3100

3200

3250

3300

3400

CONTROL TECHNIQUES FOR MOTOR DRIVEN SYSTEMS

RELATED APPLICATIONS

This application is a divisional of U.S. application Ser. No. 12/572,559, "Control Techniques for Motor Driven Systems", filed on Oct. 2, 2009, which claims the benefit of priority from U.S. Provisional Application No. 61/150,958, "Control Protocols for Motor-Driven Mechanical Systems", filed Feb. 9, 2009, the disclosure of which is incorporated herein by reference in its entirety.

U.S. application Ser. No. 12/572,559 is a continuation-in-part of U.S. application Ser. No. 12/367,883, "Control Techniques for Motor Driven Systems", filed on Feb. 9, 2009 (issued as U.S. Pat. No. 8,299,744), and is also a continuation-in-part of U.S. application Ser. No. 12/367,938, "Control Techniques for Motor Driven Systems", filed on Feb. 9, 2009 (now abandoned), the disclosures of both of which are incorporated herein by reference in their entirety.

BACKGROUND

The present invention relates to motor control and control of motor driven systems. In particular, it relates to control of motor driven systems that minimize ringing or 'bounce' in the mechanical systems that are under motor control.

Motor driven translational systems are commonplace in modern electrical devices. They are used when it is necessary to move a mechanical system within a predetermined range of motion under electrical control. Common examples can include autofocus systems for digital cameras, video recorders, portable devices having such functionality (e.g., mobile phones, personal digital assistants and hand-held gaming systems) and laser drivers for optical disc readers. In such systems, a motor driver integrated circuit generates a multi-value drive signal to a motor which, in turn, drives a mechanical system (e.g. a lens assembly, in the case of an auto-focus system). The motor driver generates the drive signal in response to an externally supplied codeword. The code word often is a digital value that identifies a location within the mechanical system's range of motion to which the motor should move the mechanical system. Thus, the range of motion is divided into a predetermined number of addressable locations (called "points" herein) according to the number of code words allocated to the range of motion. The drive signal is an electrical signal that is applied directly to the motor to cause the mechanical system to move as required.

Although the types and configurations of the mechanical systems typically vary, many mechanical systems can be modeled as a mass coupled to a spring. When a motor moves the mass according to the drive signal, the motion generates other forces within the system which can cause the mass to oscillate around the new location at some resonant frequency ($f_R$). For example, resonant frequencies of approximately 110 Hz have been observed in consumer electronic products. Such oscillation typically diminishes over time but it can impair performance of the device in its intended function by, for example, extending the amount of time that a camera lens system takes to focus an image or the time a disk reader takes to move to a selected track.

FIG. 1 is a simplified block diagram of a motor-driven system commonly used in lens drivers. The system includes an imaging chip 110, a motor driver 120, a voice coil motor 130 and a lens 140. The motor driver generates a drive signal to the voice coil motor in response to a code provided by the imaging chip. In turn, the voice coil motor moves the lens within its range of motion. Movement of the lens changes the way the lens focuses incoming light on a surface of the imaging chip, which can be detected and used to generate new codes to the motor driver. FIG. 2 is a frequency plot of possible response of the system of FIG. 1, illustrating a resonant frequency at frequency $f_R$.

FIG. 3 illustrates two drive signals generated by conventional motor drivers. A first drive signal is a step function, that changes from a first state to a second state as a discontinuous jump (FIG. 3($a$)). The second illustrated drive signal is a ramp function that changes from the first state to the second state at a fixed rate of change (FIG. 3($b$)). Both types of drive signals, however, cause the ringing behavior that impairs performance as noted above. FIG. 4, for example, illustrates ringing observed in one such mechanical system.

The inventors have observed that the ringing behavior of such motor-driven systems unnecessarily extends the settling times of such mechanical systems and degrades performance. Accordingly, there is a need in the art for such motor-driven systems that can be driven according to a digital codeword and avoids the oscillatory behavior noted in these systems.

BRIEF DESCRIPTION OF THE DRAWINGS

FIG. 1 is a block diagram of an exemplary mechanical system suitable for use with the present invention.

FIG. 2 is a graph of frequency response of an exemplary mechanical system and oscillation that may occur during activation.

FIGS. 3 ($a$) and ($b$) illustrate conventional drive signals for mechanical systems.

FIG. 4 illustrates response of a mechanical system observed under a unitary step drive signal.

FIG. 5 illustrates a drive signal according to an embodiment of the present invention.

FIG. 6 is a graph illustrating height and position of the drive signal of FIG. 5.

FIG. 7 is a graph illustrating energy distribution by frequency of a drive signal of the present invention.

FIG. 8 illustrates response of a mechanical system observed under a drive signal such as shown in FIG. 5.

DETAILED DESCRIPTION

Figure 9:
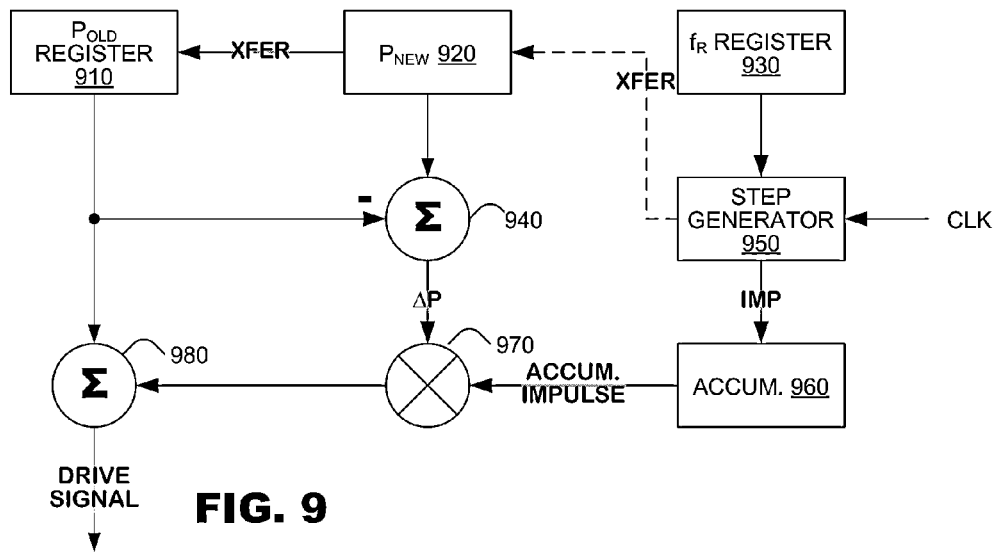
FIG. 9 is a block diagram of a system according to an embodiment of the present invention.

Embodiments of the present invention provide a drive signal for a motor-driven mechanical system whose frequency distribution has zero (or near zero) energy at the expected resonant frequency of the mechanical system. The drive signal may be provided in a series of steps according to a selected row of Pascal's triangle, wherein the number of steps equals the number of entries from the selected row of Pascal's triangle, each step has a step size corresponding to a respective entry of the selected row of Pascal's triangle, and the steps are spaced from each other according to a time constant determined by an expected resonant frequency of the mechanical system. Alternatively, the stepped drive signal may be provided as a series of uniform steps according to a selected row of Pascal's triangle, in which the steps are spaced into a number of intervals corresponding to the number of entries from the selected row of Pascal's triangle and each interval includes a number of steps corresponding to a respective entry from the selected row of Pascal's triangle. These techniques not only generate a drive signal with substantially no energy at the expected resonant frequency, they provide a zero-energy "notch" of sufficient width to tolerate systems in which the actual resonant frequency differs from the expected resonant frequencies. The motor driver may also include a detection system to measure properties of a back channel and derive oscillatory characteristics of the mechanical system. Uses of the detection system may include calculating the resonant frequency of the mechanical system and a threshold drive $D_{TH}$ required to move the mechanical system from the starting mechanical stop position. The back channel calculations may be used either to replace or to improve corresponding pre-programmed values.

FIG. 5 is a graph illustrating an exemplary drive signal according to an embodiment of the present invention. The drive signal is a multi-stage step function that changes at times corresponding to a time constant:

$$t_c \cong \frac{1}{2f_R}. \qquad \text{Eq. 1}$$

This translates to a drive signal with two steps, a first step at time $t_0$, having an amplitude corresponding to approximately one half the level needed to traverse a distance separating a old position ($P_{OLD}$) from a new position ($P_{NEW}$) ($\Delta P = P_{NEW} - P_{OLD}$). A second step may occur at time $t_0 + t_C$, having an amplitude corresponding to the rest of the distance needed to be traversed. FIG. 6 illustrates differential response of the drive signal of FIG. 5.

FIG. 7 is a graph illustrating energy distribution of the drive signal of FIG. 5 by frequency. As shown, the drive signal has non-zero energy distribution at frequencies both above and below the resonant frequency $f_R$. At the resonant frequency $f_R$, the drive signal has zero energy. This energy distribution minimizes energy imparted to the mechanical system in the resonant region and, therefore, avoids oscillation that may occur in such systems.

FIG. 7 also illustrates energy distribution that may occur in a drive signal generated from a unitary step function (phantom). In this graph, the system has non-zero energy at the resonant frequency $f_R$, which causes energy to be imparted to the mechanical system at this frequency. This non-zero energy component at the resonant frequency $f_R$ is believed to contribute to the prolonged oscillation effect observed by the inventors.

FIG. 8 is a graph that illustrates response of a mechanical system when driven by a drive signal having a shape as shown in FIG. 5 (case (a)). The mechanical system starts at a position $P_{OLD}$ and moves to a position $P_{NEW}$. Activation pulses are applied at times $t_0$ and $t_0 + t_C$. In this example, $P_{OLD}$ corresponds to 27 μm (digital code 50) and $P_{NEW}$ correspond to 170 μm (digital code 295), $t_0$ corresponds to t=0 and $t_C$ corresponds to 3.7 ms.

FIG. 8 compares the mechanical system's response under the drive signal proposed herein (case (a)) against the response observed when driven by a drive signal according to a unitary step function (case (b)). Whereas in case (a) the mechanical system has settled on the new position $P_{NEW}$ after about 4 ms, the same mechanical system exhibits prolonged oscillation in case (b). Even after 30 ms, the mechanical system continues to oscillate about the $P_{NEW}$ position. Accordingly, the drive signal of FIG. 5 provides substantially faster settling times than conventional drive signals.

FIG. 9 is a block diagram of a system 900 according to an embodiment of the present invention. As shown, the system may include registers 910-930 for storage of data representing the old and new positions and the expected resonant frequency of the mechanical system. The system 900 may include a subtractor 940 to calculate ΔP from $P_{NEW}$ and $P_{OLD}$. The system 900 further may include a step generator 950 that receives a system clock and generates pulses to an accumulator 960 according to timing determined from Eq. 1. The step generator 950 may generate pulses, for example, as shown in FIG. 6, having amplitudes each corresponding to approximately one half the total distance to be traversed by the mechanical system. The accumulator 960 may sum the aggregate value of pulses generated by the step generator 950 and output the aggregate value to a multiplier 970 that also receives the ΔP value from the subtractor. Thus, the multiplier 970 generates a signal corresponding to the multi-step increments shown in FIG. 5. The output of the multiplier 970 may be input to an adder 980 that also receives the $P_{OLD}$ value from register 910. Thus, the adder 980 may generate a time varying output signal sufficient to drive a mechanical system from a first position to a second position with minimal settling time.

When the mechanical system completes its translation from the old position to the new position, the old position may be updated. In the system illustrated in FIG. 9, after the step generator 950 generates its final step to the accumulator, it also may generate a transfer signal to registers 910 and 920 to cause the old position register 910 to be updated with data from the new position register 920.

The drive signal of FIG. 5 works well if the resonant frequency $f_R$ of the mechanical system matches the 'notch' of the drive signal precisely (e.g. within ±3%). Unfortunately, system manufacturers often do not know the resonant frequency of their mechanical systems precisely. Moreover, particularly in consumer devices where system components must be made inexpensively, the resonant frequency can vary across different manufacturing lots of a common product. Thus, although a motor driver might be designed to provide a notch at an expected resonant frequency $f_{RE}$, there can be a substantial difference between the expected resonant frequency and the actual resonant frequency of the mechanical system ($f_{RM}$).

Figure 10:
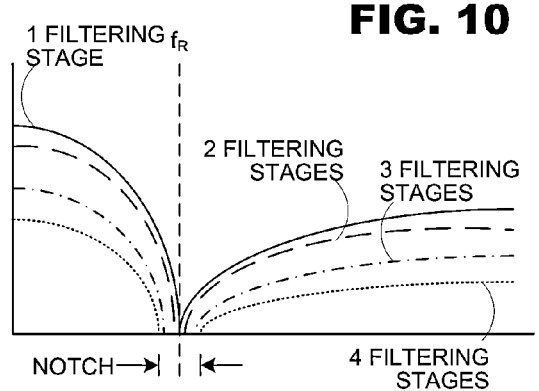
FIG. 10 is a graph illustrating energy distribution by frequency of another drive signal of the present invention.

To accommodate such uses, the principles of the present invention may be expanded to expand the frequency notch to allow greater tolerance in the resonant frequencies used with such systems. One such expansion includes providing multiple layers of filtering to 'widen' the notch. FIG. 10 is a graph showing the expected effects of multiple layers of filtering. Four such layers of filtering are illustrated. Each such additional layer of filtering expands a "notch" of frequencies for which there is zero energy imparted to the system. Although each layer of filtering diminishes the aggregate amount of energy imparted to the system and, therefore, may cause slower movement by the mechanical system, such filtering may be advantageous to overall system operation by reducing settling times for mechanical systems even when the resonant frequency of such systems cannot be predicted with precision.

Figure 11:
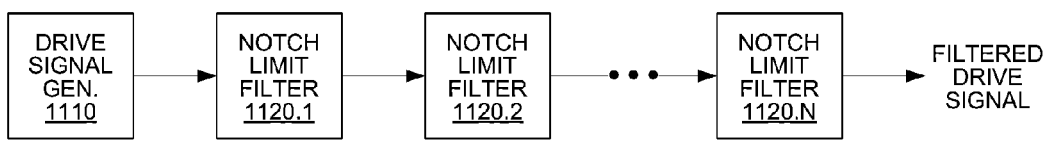
FIG. 11 is a block diagram of a system according to an embodiment of the present invention.

FIG. 11 illustrates a simplified block diagram of a system 1100 according to another embodiment of the present invention. The system includes a drive signal generator 1110 and one or more notch limit filters 1120.1-1120.N provided in series. A first filter 1120.1 in the system 1100 may accept a drive signal from the drive signal generator 1110. Each of the N filters (N≥1) may filter its input signal at an expected resonant frequency ($f_{RE}$). Because the filters are provided in cascade, the multiple filters may operate collectively to provide a filtered drive signal having a notch that is wider than would occur from a single filter system. Alternatively, the additional notches may be placed at different frequencies around the expected single resonant frequency in order to widen the filter's attenuation band.

In the time domain, the additional levels of filtering provide a step response as follows:

TABLE 1

| TIME | 0 | $T_C$ | $2T_C$ | $3T_C$ | $4T_C$ |
|---|---|---|---|---|---|
| 1 Stages | 1 | 1 | | | |
| 2 Stages | 1 | 2 | 1 | | |
| 3 Stages | 1 | 3 | 3 | 1 | |
| 4 Stages | 1 | 4 | 6 | 4 | 1 |

The output drive signals follow the step responses as shown in Table 1 after having been normalized (the steps are scaled so their sum equals 1). For example, with respect to a three-stage system, the step responses would be set to ⅛, ⅜, ⅜ and ⅛ at each of the times noted in Table 1. Drive signals are generated from a sum of the step responses over time. Thus, the drive signals of Table 1 may generate waveforms having the shape shown in FIG. 12.

The progression shown in Table 1 matches the progression of Pascal's Triangle. In an embodiment, an arbitrary N stage filter may be employed by using a progression taken from a corresponding $N^{th}$ row of Pascal's Triangle. An arbitrary number of stages may be used as desired to protect against uncertainty in the expected resonant frequency of the mechanical system. Although any number of stages may be used, higher numbers of stages involve increased settling times and therefore the number of stages should be chosen with care.

Figure 13:
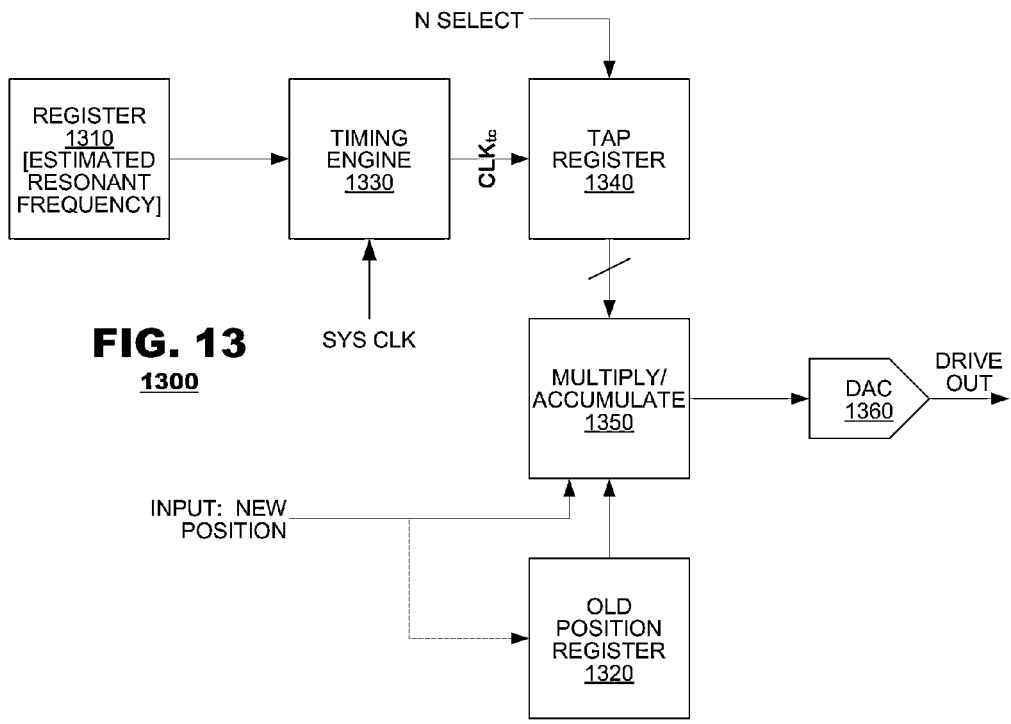
FIG. 13 is a simplified block diagram of a drive signal generator according to an embodiment of the present invention.

FIG. 13 is a block diagram of a signal generator 1300 according to an embodiment of the present invention. The signal generator 1300 may include a pair of registers 1310, 1320 to store data representing the estimated resonant frequency and the current position $P_{OLD}$ of the mechanical system. A timing engine 1330 and a tap register 1340 may generate an output corresponding to an appropriate step pattern such as those illustrated in Table 1. Specifically, the timing engine 1330 may clock the tap register 1340 at a rate corresponding to time intervals $t_C$ determined by the stored estimated resonant frequency. The tap register 1340 may store data representing the normalized values of Pascal's triangle. Based on a control signal (N select) identifying the row of Pascal's triangle to be applied, the tap register 1340 sequentially may output step values corresponding to each entry in the row on each cycle of the $t_C$ clock.

A multiply accumulate (MAC) unit 1350 may receive data representing the new position $P_{NEW}$, the old position $P_{old}$ and the step pattern data from the tap register 1340. Mathematically, the MAC 1340 may generate a digital drive code as:

$$\text{Drive}(t) = P_{OLD} + (P_{NEW} - P_{OLD}) \cdot \Sigma \text{step}(t), \text{ where}$$

step(t) represents the step response of the selected pattern and t varies across all $t_C$ intervals that are relevant for the selected pattern. A digital-to-analog converter (DAC) 1360 may generate an analog drive output signal from the MAC's digital output. The output signal may be generated as current or voltage.

The solution of FIG. 13 provides a wider notch as desired over the embodiment of FIG. 9 but does so at increased complexity. Normalized values of each row of Pascal's triangle must be stored in memory at the tap register or calculated dynamically. Such complexity may be avoided in another embodiment of the present invention in which timing misalignment is applied to the step graphs.

Consider the step response shown in Table 1. The response of any stage N (say n=3) is the sum of a prior stage N−1 and a replica of the same (stage N−1) delayed by a time constant $t_C$. For example:

TABLE 2

| NO STAGES | TIME CONSTANT | | | | |
|---|---|---|---|---|---|
|  | 0 | $T_c$ | $2T_c$ | $3T_c$ | $4T_c$ |
| 1 | 1 ↓ ↘ | 1 ↓ ↘ | | | |
| 2 | 1 ↓ ↘ | 2 ↓ ↘ | 1 ↓ ↘ | | |
| 3 | 1 ↓ ↘ | 3 ↓ ↘ | 3 ↓ ↘ | 1 ↓ ↘ | |
| 4 | 1 | 4 | 6 | 4 | 1 |

In an embodiment, the system generates step response patterns that represent replica signals that are misaligned with respect to each other slightly in time (shown as Δt in Table 3 below). The step response patterns may be represented as follows:

TABLE 3

| N | t0 | $t_c$ | | | | $2t_c$ | | | | | | $3t_c$ | | | | 4tc |
|---|---|---|---|---|---|---|---|---|---|---|---|---|---|---|---|---|
|  |  | +0 | +Δt | +2Δt | +3Δt | +0 | +Δt | +2Δt | +3Δt | +4Δt | +5Δt | +0 | +Δt | +2Δt | +3Δt |  |
| 1 | 1 | 1 |  |  |  |  |  |  |  |  |  |  |  |  |  |  |
| 2 | 1 | 1 | 1 |  |  | 1 |  |  |  |  |  |  |  |  |  |  |
| 3 | 1 | 1 | 1 | 1 |  | 1 | 1 | 1 |  |  |  | 1 |  |  |  | 1 |
| 4 | 1 | 1 | 1 | 1 | 1 | 1 | 1 | 1 | 1 | 1 | 1 | 1 | 1 | 1 | 1 | 1 |

Figure 14:
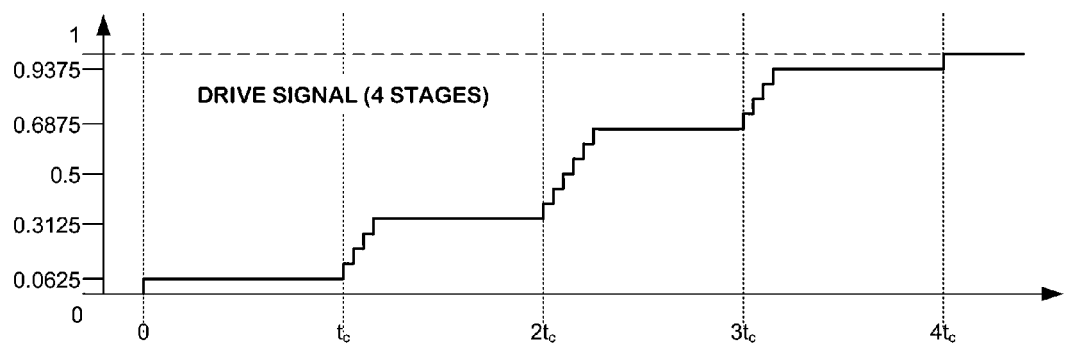
FIG. 14 is a graph illustrating another exemplary drive signal according to an embodiment of the present invention.

The step patterns may generate a drive signal such as shown in the example of FIG. 14. In the example illustrated, N=4.

In practice, the Δt time intervals may be provided by a system clock within the motor driver, which may be much faster than the $t_C$ time interval calculated from the expected resonant frequency $f_R$. FIG. 14 is not drawn to scale. In one embodiment, some coefficients may be swapped with each other in order to widen the attenuation band. Coefficient swapping may reduce the requirements of small $t_C$ time intervals. Δt, for example, may be set to 1/4 $t_C$ or 1/8 $t_C$ when coefficient swapping is utilized.

A time domain embodiment may include a cascade of unequally distributed notches provided by a convolution of N filters, each filter corresponding to the first row of Pascal's triangle. The filters may be tuned to present notches around the nominal resonance frequency. The filters may also be convolved using a common time base as defined by a minimum common multiplier of their time constant $t_C$.

Figure 15:
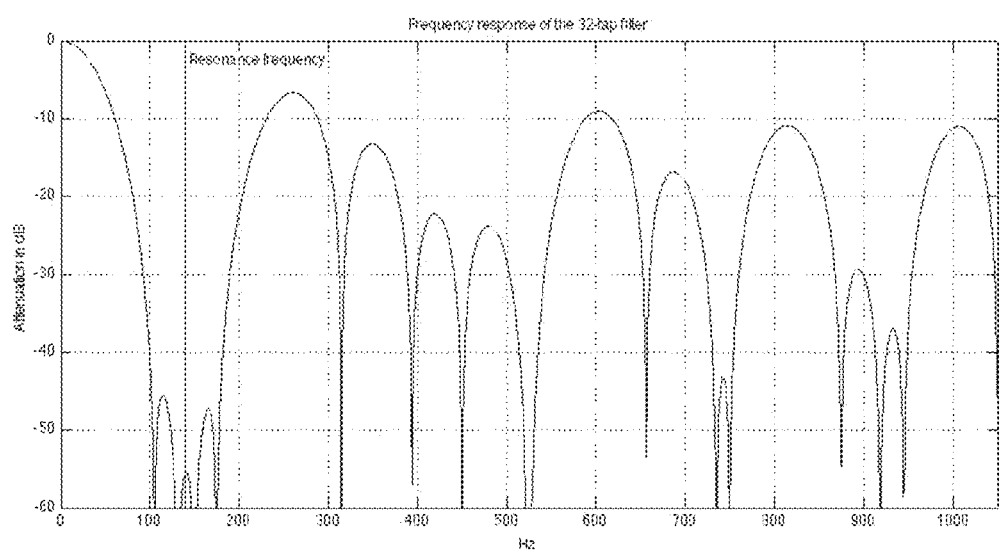
FIG. 15 is a graph illustrating a frequency response of an exemplary filtering system.

One example may include 4 filters whose responses are {1 00000 1} {1 000000 1} {1 0000000 1} and {1 000000000 1}. When the 4 filters are convolved with a time base of approximately 30 times the resonance period, a 32-tap filter with coefficients {1 0 0 0 0 0 1 1 1 0 1 0 0 1 1 1 1 1 1 0 0 1 0 1 1 1 0 0 0 0 0 1} results. FIG. 15 illustrates the frequency response of the example 32-tap filter for a 140 Hz nominal resonance frequency.

Figure 16:
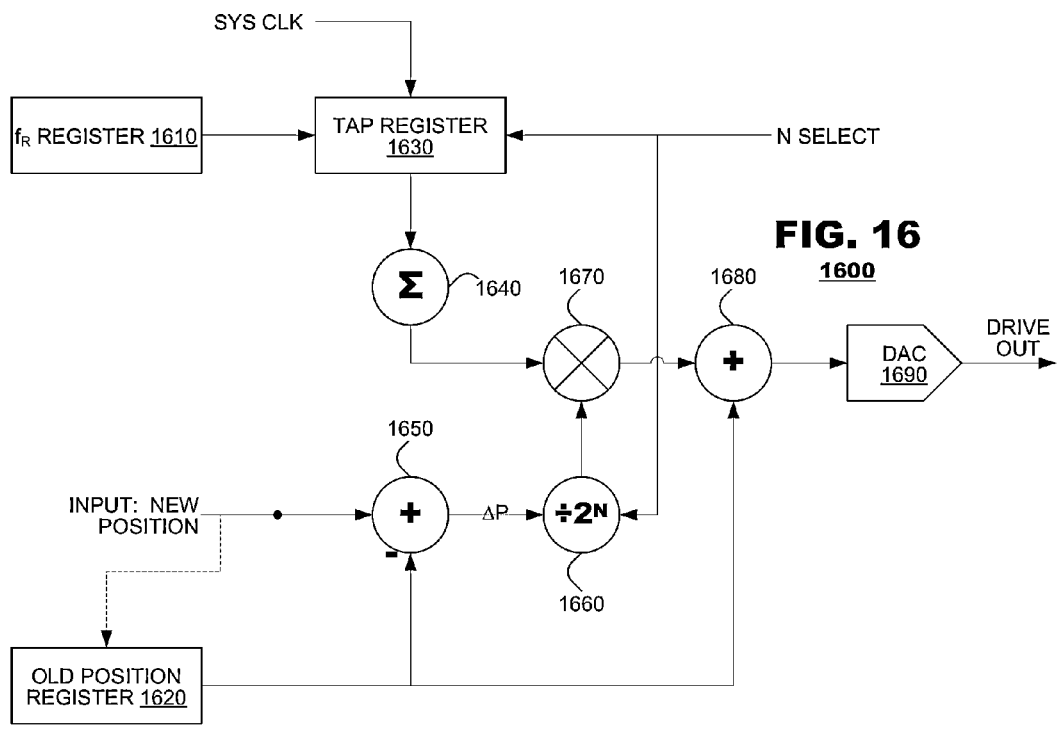
FIG. 16 is a simplified block diagram of a drive signal generator according to another embodiment of the present invention.

FIG. 16 illustrates a drive signal generator 1600 according to another embodiment of the present invention. The drive signal generator may include a pair of registers 1610, 1620 to store data representing the estimated resonant frequency of the mechanical system and a current position of the mechanical position ($P_{OLD}$). The drive signal generator may include a tap register 1630 that stores distributed step patterns such as those shown in Table 3. In response to each iteration of a system clock (corresponding to Δt), the tap register 1630 may shift out a single bit of the step pattern. The tap register may include buffer bits (zeroes) corresponding to time intervals separating each time constant $t_C$. The shifted bits may be output to an accumulator 1640 which computes a running sum of pulses over time.

A subtractor 1650 may calculate ΔP from the old and new positions ($\Delta P = P_{NEW} - P_{OLD}$).

A divider may divide the ΔP by a factor $\frac{1}{2^N}$, which may be implemented with a simple bit shift, where N represents the row of Pascal's triangle currently in use. A multiplier 1670 and adder 1680 complete generation of the drive signal which, mathematically, may be represented as:

$$\text{Drive}(t) = P_{OLD} + \frac{1}{2^N}(P_{NEW} - P_{OLD}) \cdot \sum \text{step}(t).$$

In this embodiment, the step(t) term again represents pulses from the tap register. In this embodiment, however, the tap register need not store normalized step values. Instead, the tap register may store single bit values (1 s) at each of the Δt positions for which incremental contribution is required (see, Table 3). Within each of the N rows, the single bit steps sum to $2^N$. In this embodiment, the divider 1660 accomplishes normalization while permitting a simple implementation of the tap register. The DAC may generate an analog signal, either voltage or current, from the codeword output by the adder 1680.

While FIG. 16 illustrates the tap register 1630 being clocked by a system clock, the tap register alternatively may be clocked by a timing generator (not shown), that becomes active during a time period defined by each time constant $t_C$ and, when active, clocks the tap register at a rate of Δt. When each burst of pulses concludes, the timing generator may be deactivated until the next $t_C$ interval occurs. This second embodiment permits the size of the tap register to be made smaller but increases complexity of the clocking system.

Figure 17:
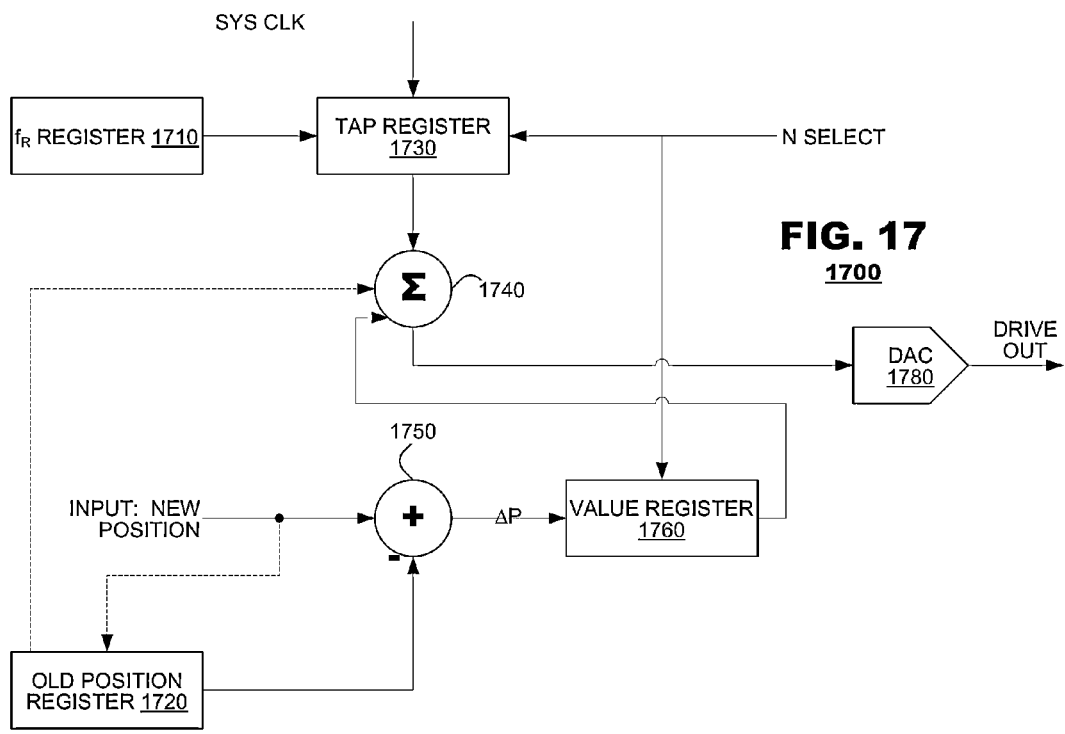
FIG. 17 is a simplified block diagram of a drive signal generator according to another embodiment of the present invention.

FIG. 17 illustrates a drive signal generator 1700 according to another embodiment of the present invention. The drive signal generator may include a pair of registers 1710, 1720 to store data representing the estimated resonant frequency of the mechanical system and a current position of the mechanical position ($P_{OLD}$). The drive signal generator may include a tap register 1730 that stores distributed step patterns such as those shown in Table 3. In response to each iteration of a system clock (corresponding to Δt), the tap register 1730 may shift out a single bit of the step pattern. The tap register may include buffer bits (zeroes) corresponding to time intervals separating each time constant $t_C$. The shifted bits may be output to an accumulator 1740.

In this embodiment, the $P_{old}$ value may be preloaded into the accumulator 1740. A subtractor 1750 may calculate ΔP from the old and new positions ($\Delta P = P_{NEW} - P_{OLD}$). Value register 1760 may use N bit shifting to divide ΔP by $2^N$ in order to calculate step sizes. The calculated step size may be stored in the value register 1760. Accumulator 1740, which is initialized with the old position value, may be updated with the addition of the content value contained in the value register 1760 each time the tap register 1730 shifts a bit with a value of one. The DAC 1780 may generate an analog signal, either voltage or current, from the codeword output by the accumulator 1740.

The embodiments of FIGS. 16 and 17 are advantageous because they provide for simpler implementation than the embodiment of Table 1 & FIG. 13. The step responses of the FIG. 14/Table 3 embodiment are uniform and, therefore, there is no need to develop fractional step response values as discussed with respect to Table 1. As with the FIG. 13 embodiment, the FIG. 16 and FIG. 17 embodiments also contribute to a wider notch as compared to the FIG. 5 embodiment.

Figure 18:
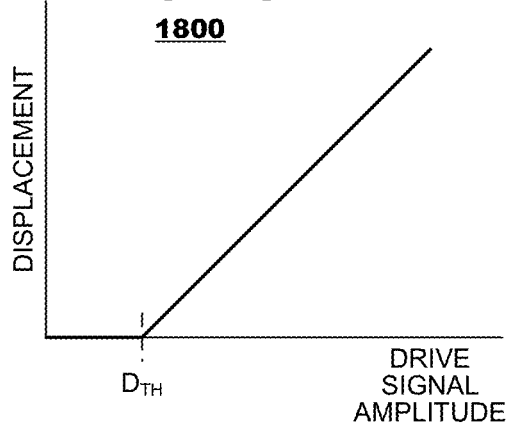
FIG. 18 is an exemplary graph illustrating typical displacement of a mechanical system (after settling) versus an applied drive signal.

Many mechanical systems do not move from the starting mechanical stop position immediately upon application of a drive signal. There usually are spring forces or other inertial forces that are not overcome until the amplitude of the drive signal reaches some threshold value $D_{TH}$ (FIG. 18). The threshold value often is unknown and may vary from manufacturing lot to manufacturing lot. Furthermore, the threshold value may vary according to the mechanical system orientation.

Figure 19:
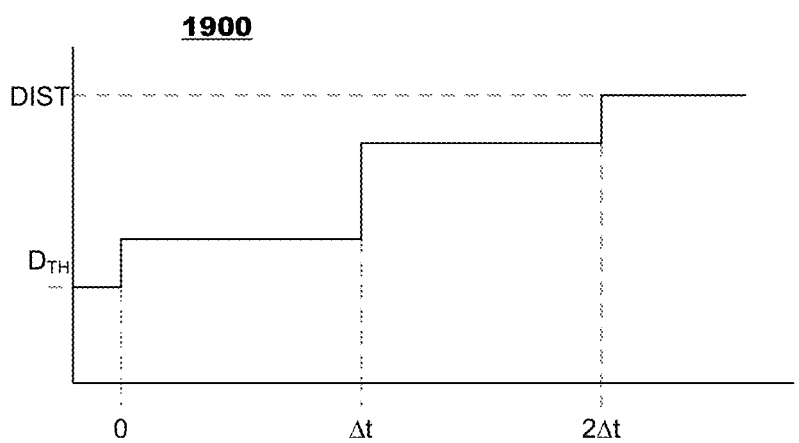
FIG. 19 is a graph illustrating an exemplary drive signal according to a further embodiment of the present invention.

To improve response times, when moving from a start position corresponding to a mechanical stop position, embodiments of the present invention may advance the drive signal to a value corresponding to the threshold drive signal $D_{TH}$ (FIG. 19) and calculate AP as a difference between $D_{TH}$ and the drive signal level sufficient to move the mechanical system to the destination position. When applying a drive signal to such a system, the drive signal may include the $D_{TH}$ level applied immediately from the motor drive and a time-varying component corresponding to a stepped drive signal of one of the foregoing embodiments (FIGS. 5, 12 and/or 14) provided atop the $D_{TH}$ level. The threshold drive $D_{TH}$ may be estimated in a "blind" fashion (e.g. based on expected properties of the mechanical systems, which may or may not be true). Alternatively, the threshold value may be programmed into the system via a register.

The principles of the present invention find application in a variety of electrically-controlled mechanical systems. As discussed above, they may be used to control lens assemblies in auto-focus applications for cameras and video recorders such as shown in FIG. 1. It is expected that systems using the drive signals discussed herein will achieve improved performance because the lens assemblies will settle at new locations faster than may occur in systems with conventional drive signals. Accordingly, cameras and video recorders will generate focused image data faster than previously achieved, which we generate greater throughput.

Figure 20:
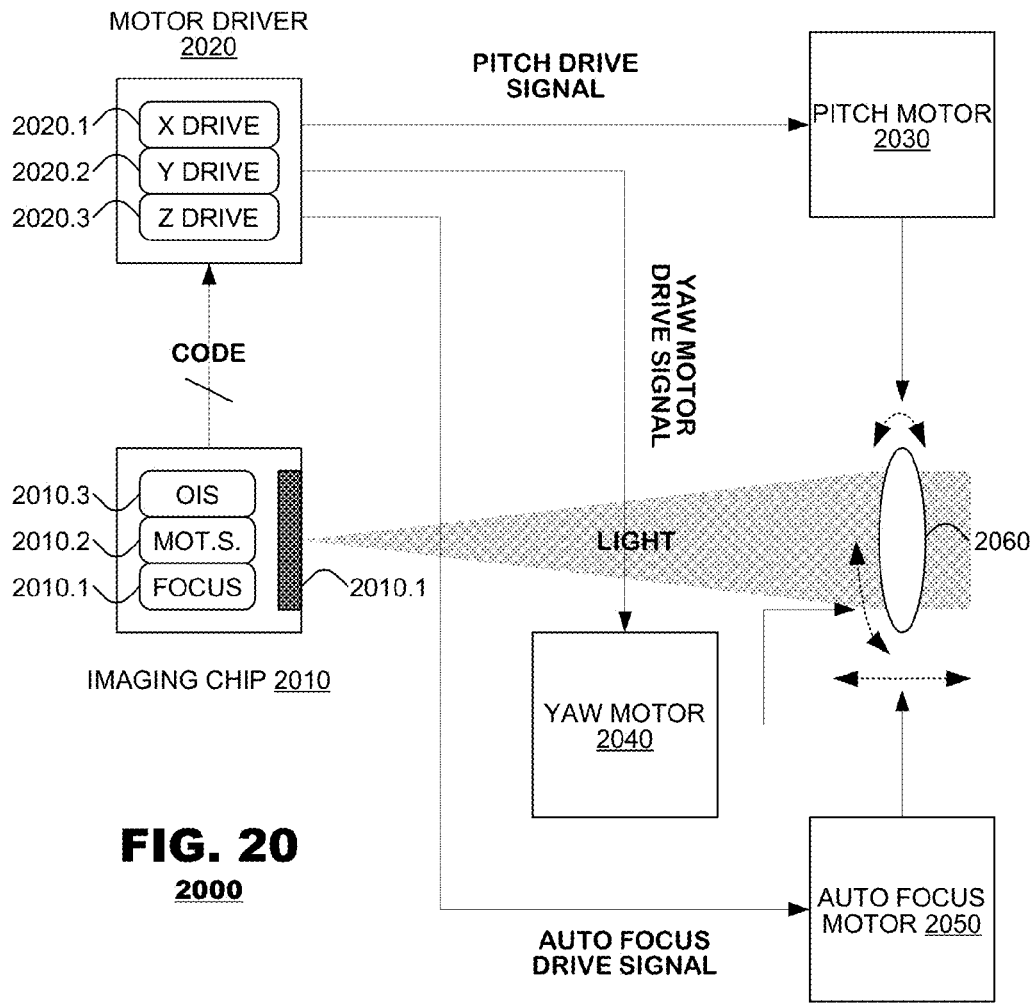
FIG. 20 is a block diagram of another mechanical system suitable for use with the present invention

FIG. 20 illustrates another system 2000 according to an embodiment of the present invention. The system 2000 of FIG. 20 illustrates a lens control system with multiple dimensions of movement. This system, as with FIG. 1, may include an imaging chip 2010, a motor driver 2020, various motors 2030-2050 and a lens 2060. Each motor 2030-2050 may drive the lens in a multi-dimensional space. For example, as shown in FIG. 20, an auto focus motor 2030 may move the lens laterally with respect to the imaging chip 2010, which causes light to be focused in a light-sensitive surface 2010.1 of the chip 2010. A pitch motor 2040 may rotate the lens through a first rotational axis to control orientation of the lens 2060 in a first spatial dimension. A yaw motor 2050 may rotate the lens through a second rotational axis, perpendicular to the first rotational axis, to control orientation of the lens 2060 in another spatial dimension.

In the embodiment of FIG. 20, the imaging chip 2010 may include processing units to perform auto-focus control 2010.1, motion detections 2010.2 and optical image stabilization (OIS) 2010.3. These units may generate codewords for each of the drive motors 2030-2050, which may be output to the motor driver 2020 on an output line. In the embodiment shown in FIG. 20, the codewords may be output to the motor driver 2020 in a multiplexed fashion. The motor driver 2020 may include motor drive units 2020.1-2020.3 to generate analog drive signals for each of the drive motors 2030-2050. The analog drive signals may be generated according to the foregoing embodiments discussed herein. As with the case of a one dimensional lens driver, it is expected that a multi-dimensional lens driver that is driven as shown in the foregoing embodiments will achieve faster settling times than lens drivers driven according to conventional drive signals.

Figure 21:
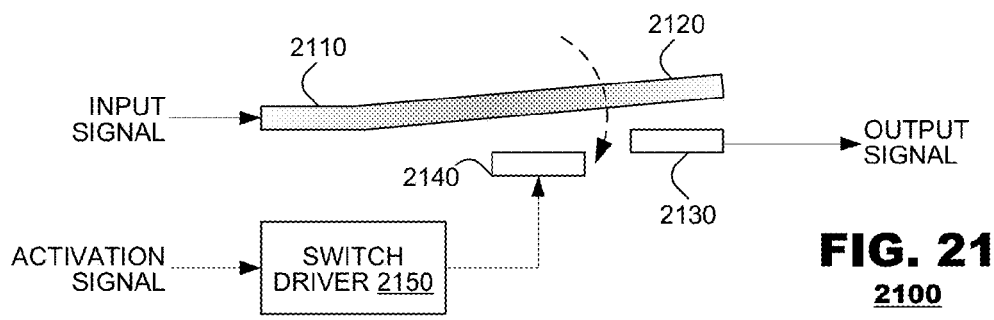
FIG. 21 is a simplified diagram of a MEMS switch system according to an embodiment of the present invention.

The principles of the present invention find application in other systems, for example, MEMS-based switches as shown in FIG. 21. Such systems may include a switch member 2110 that moves under control of a control signal between an open position and a closed position. When closed, a movable 'beam' portion 2120 of the switch member 2110 is placed in contact with an output terminal 2130. The control signal is applied to the switch member 2110 through a control terminal 2140 that imparts electrostatic forces upon the switch member 2110 to move it from a normally open position to the closed position. In this regard, the operation of a MEMS switch is known.

Figure 12:
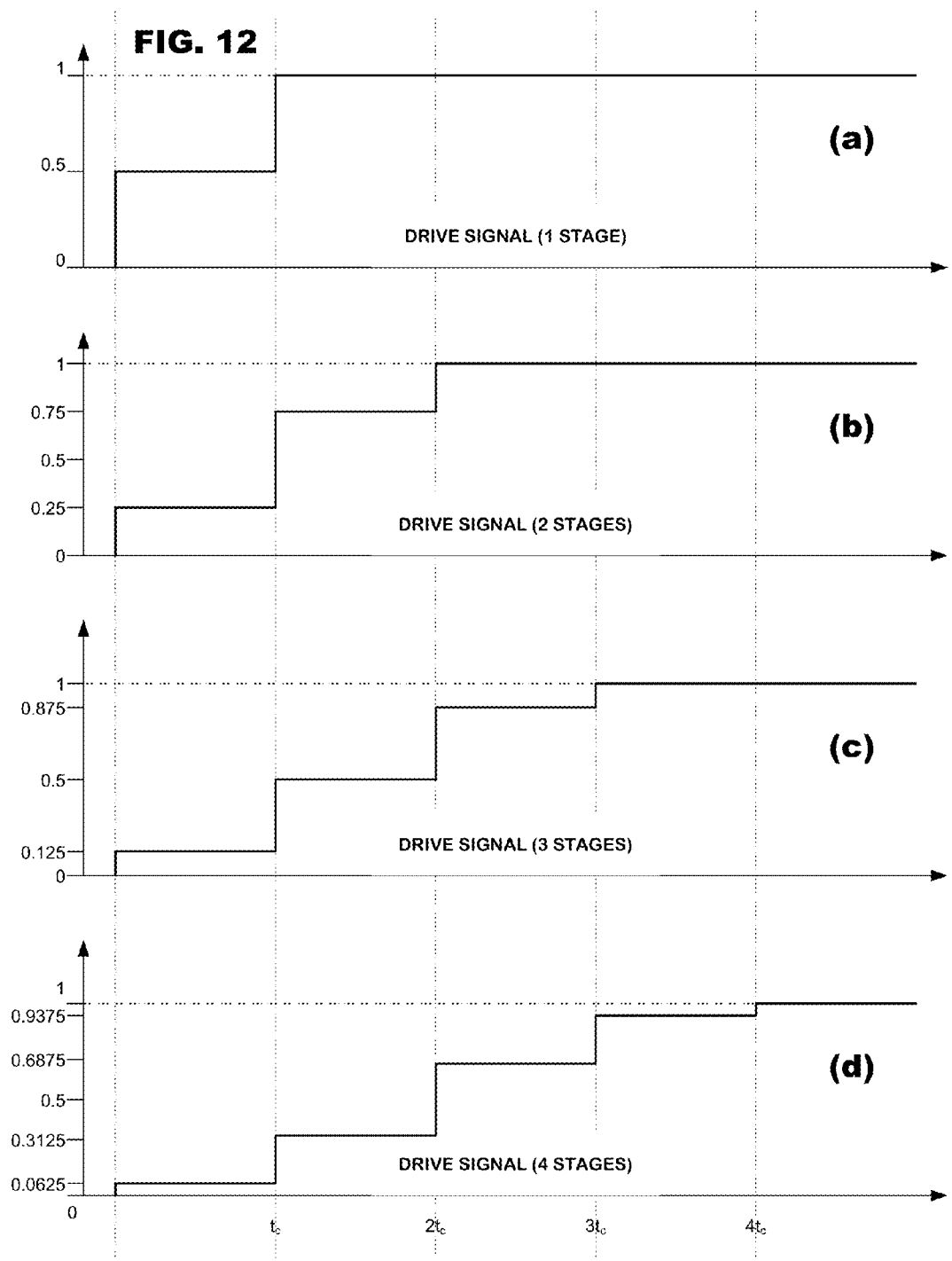
FIGS. 12 ($a$)-($d$) are graphs illustrating other exemplary drive signals according to an embodiment of the present invention.

According to an embodiment, a MEMS control system may include a switch driver 2150 that, responsive to an actuating control signal, generates a drive signal to the MEMS-switch having a shape such as shown in FIG. 5, 12 or 14. MEMS switches will possess from which an expected resonant frequency and, by extension, the time constant $t_C$ may be derived. The switch driver 2150 may apply steps having an aggregate amplitude sufficient to move the beam 2120 toward the output terminal 2130. At the conclusion of a final time constant, the switch driver 2150 may apply a final step to halt the beam 2120 at the closed position with minimal oscillation.

Figure 22:
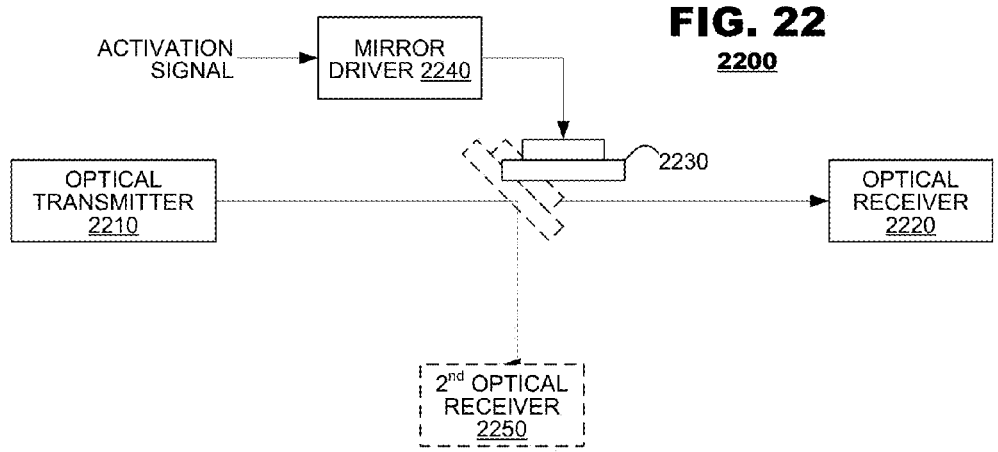
FIG. 22 is a simplified diagram of a MEMS mirror control system according to an embodiment of the present invention.

The principles of the present invention also may find application in optical MEMS systems, such as shown in FIG. 22. There, an optical transmitter 2210 and optical receiver 2220 are provided in a common optical path. A MEMS mirror 2230 may be provided along the optical path, which may translate from a first position to a second position under control of a drive signal. In a default state, for example, the MEMS mirror 2230 may be positioned out of the optical path between the transmitter 2210 and the receiver 2220. In an activated state, however, the MEMS mirror 2230 may move to obscure the optical path, which causes the transmitted beam of light to be blocked from reaching the receiver 2220.

According to an embodiment, a MEMS control system may include a mirror driver 2240 that, responsive to an actuating control signal, generates a drive signal to the MEMS-mirror 2230 to cause it to move from a default position to an activated position. The mirror 2230 may possess a mass from which an expected resonant frequency and, by extension, the time constant $t_C$ may be derived. The mirror driver 2240 may apply steps having an aggregate amplitude sufficient to move the mirror 2230 toward the activated position. At the conclusion of a final time constant, the mirror driver 2240 may apply a final step to halt the mirror 2230 at the activated position with minimal oscillation.

The optical system 2200 optionally may include a second receiver 2250 provided along a second optical path that is formed when the mirror 2230 moves to the activated position. In this embodiment, the system 2200 may provide a routing capability for optical signals received by the optical system 2200.

Figure 23:
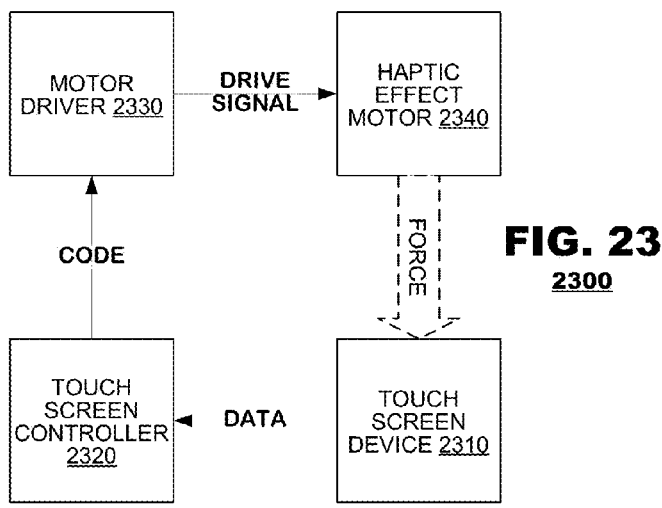
FIG. 23 is a simplified diagram of a haptic control system according to an embodiment of the present invention.

The principles of the present invention may find application in touch sensitive sensor devices that use tactile or haptic feedback to confirm receipt of data. Haptic devices provide feedback that simulates the "click" of a mechanical button or other tactile feedback. Shown in FIG. 23, such devices 2300 may include a touch screen panel 2310 to capture data from an input device, commonly an operator's finger, a stylus or other object. The touch screen panel 2310 generates data to a touch screen controller 2320 that processes the panel data to derive a screen position on which the operator entered data. To provide the haptic feedback, the touch screen controller 2320 may generate a digital codeword to a motor driver, which generates a drive signal to a haptic motor controller 2330. The haptic motor controller 2330 may generate a drive signal to a haptic effect motor 2340 which imparts a force upon a mechanical device within the touch screen panel 2310 that generates the tactile feedback.

According to an embodiment, the motor driver 2330 may generate a drive signal to the haptic effect motor 2340 according to a shape such as shown in FIG. 12 or 14. The haptic effect motor 2340 and associated mechanical components of the touch screen device may possess a mass from which an expected resonant frequency and, by extension, the time constant $t_C$ may be derived. The motor driver 2330 may apply a series of steps according to a selected row of Pascal's triangle or any embodiments of the present invention described herein. Owing to a varying mass being controlled due to user interaction, the steps may originate from a deeper row (e.g., the $4^{th}$ row or deeper) of Pascal's triangle than for other applications. It is expected that the stepped pulse drive signal will generate tactile feedback within the touch screen device that begins and concludes sharply and, therefore, provide feedback sensations that strongly mimic mechanical devices.

Figure 24:
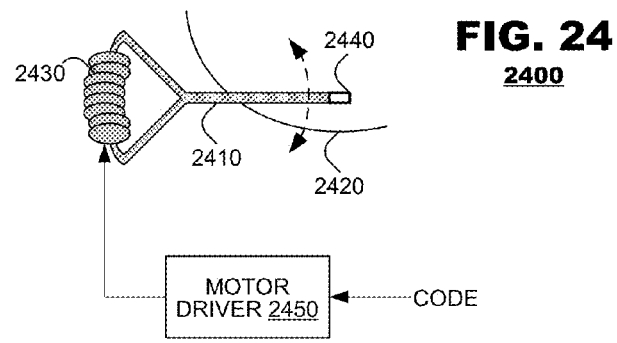
FIG. 24 is a simplified diagram of a disk reader according to an embodiment of the present invention.

The principles of the present invention also may find application in optical or magnetic disk readers, which may include swing arms or sled based readers. One common structure for disk readers is illustrated in FIG. 24, which illustrates a motor-driven swing arm 2410 provided over a disk surface 2420. The swing arm may include a motor coil 2430 mounted thereon which, when drive signals are supplied to it, generates magnetic flux that interacts with magnets (now shown) to move the swing arm across a range of motion. In this manner, a read head 2440 provided on the swing arm can address an identified track of information from the disk and read information.

According to an embodiment, a disk reader control system may include a motor driver 2450 that, responsive to a codeword, generates a drive signal to the motor coil 2430 having a shape such as shown in FIG. 5, 12 or 14. Swing arms (and sleds) may possess inertia from which an expected resonant frequency $f_R$ and, by extension, the time constant $t_C$ may be derived. The motor driver 2450 may apply steps having an aggregate amplitude sufficient to move the disk reader to a new position. At the conclusion of a final time constant, the motor driver 2450 may apply a final step to halt the reader at the addressed position with minimal oscillation.

Figure 25:
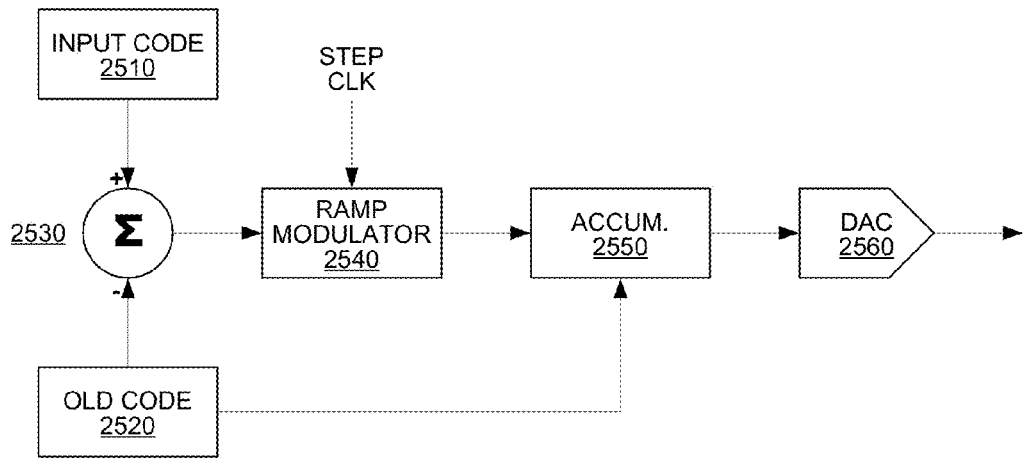
FIG. 25 is a simplified block diagram of a drive signal generator according to another embodiment of the present invention.

According to an embodiment, a drive signal generator 2500 of FIG. 25 may produce ramp-based motor drive signals with a fixed drive window. In prior motor driver systems, ramp signals are provided with a constant rate of change. In these "slope" ramp signal systems, the time to drive a mechanical system to a desired location is dependant on the distance to be traversed. For example, it would take twice as long to deliver a ramp signal corresponding to a movement 100 points as it would to deliver a ramp signal corresponding to a movement of 50 points. However, "slope" ramp signals require notch filtering and have varied frequency responses. A ramp based motor drive signal with a fixed drive window, on the other hand, may operate with linear filtering and have a constant frequency response.

The drive signal generator 2500 may include an input code register 2510 to store code representing a new position that is to be traversed. The drive signal generator 2500 may include an old code register 2520 to store code representing an old or current position of the mechanical system. A subtractor 2530 may calculate the separation distance between the old and new positions by subtracting the new position code from the old position code.

The drive signal generator 2500 may also include a ramp modulator 2540, clocked at a step clock rate, to generate a step response signal based on the separation distance. The step response may correspond to the individual steps in a particular drive signal. Furthermore, the drive signal generator 2500 may include an accumulator 2550 to generate a digital drive signal in response to the step response signal. The accumulator 2550 may be initialized with a value corresponding to the old code that was maintained from a prior operation. DAC 2560 may generate an analog drive signal from the digital drive signal.

Figure 26:
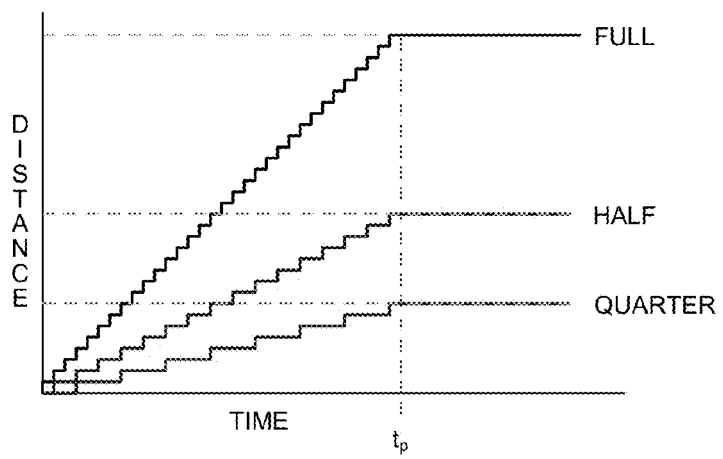
FIG. 26 is a graph illustrating exemplary drive signals according to an embodiment of the present invention.

FIG. 26 illustrates examples of ramp-based motor drive signals with a fixed drive window. The signals may cause the mechanical system to reach its desired destination within a predetermined time $t_p$, regardless of the separation distance. For example, FIG. 26 shows drive signals for full-range distance, half-range distance, and quarter-range distance traversal that operate for same predetermined time $t_p$. The predetermined time $t_p$ may be set corresponding to a time the mechanical system takes to traverse a full range displacement at 1 point/cycle. The number of steps taken to reach the desired destination may vary depending on the distance to be traversed. The steps may be distributed across time hence certain steps may 'not be taken.' For example, half-range displacement may have 50% of steps not taken as compared to the steps taken for full-range displacement. Quarter-range displacement, for example, may have 75% of steps not taken as compared to the steps taken for full-range displacement. Other ratios may cause corresponding ratios of step cycles but may also generate irregular patterns.

Drive signal generator 2500 may be used cooperatively with other embodiments described herein. For example, a motor driver system may operate in several modes with one mode being ramp based drive signal with fixed drive window mode.

Figure 27:
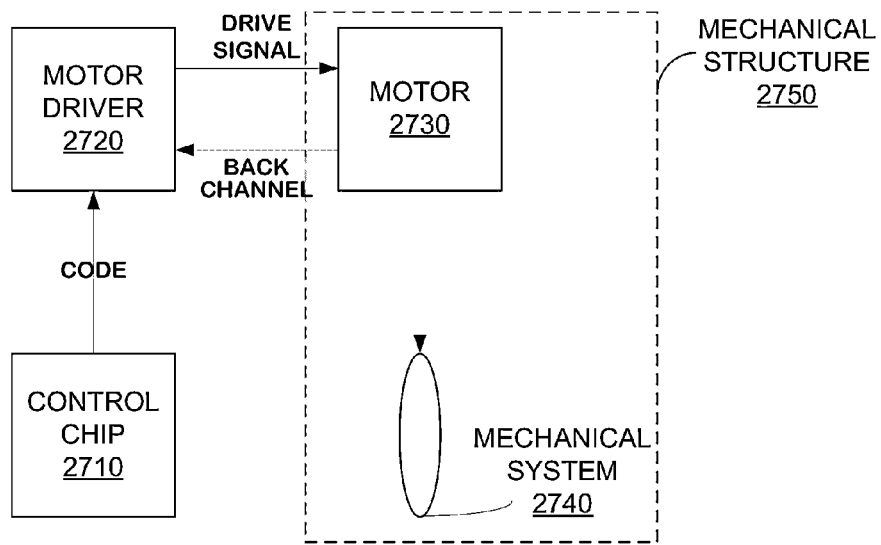
FIG. 27 is a simplified diagram of motor-driven system suitable for use with the present invention.

According to an embodiment, the motor-driven system 2700 may include a feedback system as shown in FIG. 27. The feedback system may be a detection system for a back channel, a hall effect sensor, or other suitable feedback devices. The motor-driven system may include a control chip 2710 that sends a code to instruct the motor driver 2720 to drive the mechanical structure 2730. The mechanical structure 2750 may include a motor 2730 and mechanical system 2740. The motor driver may transmit a drive signal to the motor 2730 via a signal line connecting the motor driver 2720 and the motor 2730. The motor 2730, responsive to the drive signal, moves the mechanical system 2740, which may cause oscillations or ringing behavior in the mechanical structure 2740. The oscillations may be captured by a feedback system. The oscillations induce an electrical signal in the signal line that extends between the motor 2730 and motor driver 2720. The back channel may be on the same signal line the drive signal is transmitted or may be on a separate signal line.

The back channel detection system may calculate the resonant frequency, $f_R$, of the mechanical system. System manufacturers often do not know the resonant frequency of their mechanical systems precisely. Moreover, particularly in consumer devices where system components must be made inexpensively, the resonant frequency can vary across different manufacturing lots of a common product. Therefore, the calculation of the mechanical system's actual resonant frequency rather than depending on the manufacturer's expected resonant frequency improves precision in the mechanical system during use and reduces settling time because of stop band width reduction.

Figure 28:
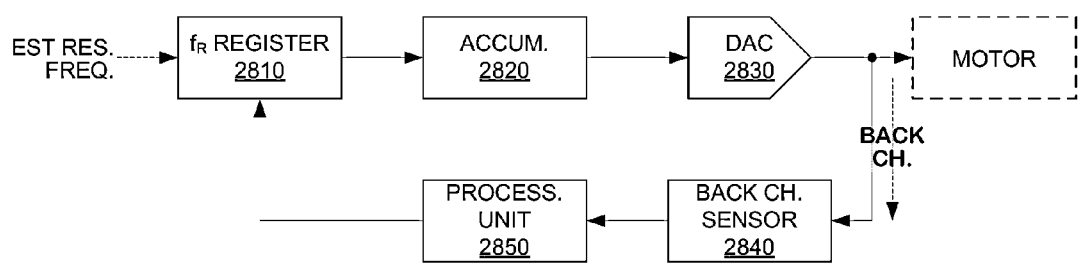
FIG. 28 is a simplified block diagram of a drive signal generator according to another embodiment of the present invention.

FIG. 28 illustrates an embodiment of a drive signal generator 2800 that may be incorporated in a motor driver to calculate the actual resonant frequency of the mechanical system. The drive signal generator 2800 may include an accumulator 2820 to generate a digital test drive signal, digital-to-analog converter (DAC) 2830 to generate an analog test drive output signal from the accumulator's digital output, which is then applied to the motor of the mechanical structure, a back channel sensor 2840 to capture a back channel electrical signal; a processing unit 2850 to calculate the actual resonant frequency; and a register 2810 that stores the calculated resonant frequency. The analog signal may be generated as current or voltage.

Figure 29:
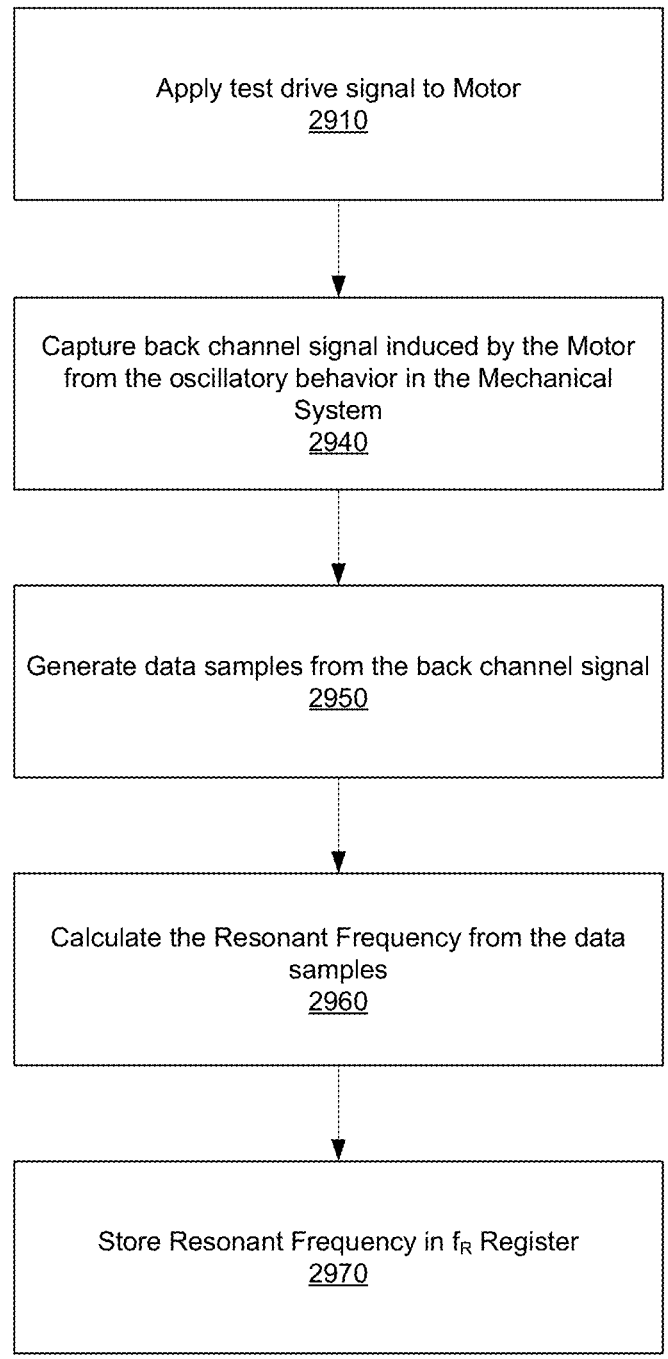
FIG. 29 shows a simplified process flow for determining a resonant frequency.

FIG. 29 is a flow diagram of a method 2900 to determine the actual resonant frequency of the mechanical system according to an embodiment of the present system. The method may include generating a test drive signal (block 2910). The test drive signal may be a unit step drive signal that has a value that is sufficient to drive the mechanical system to an intermediate position within the mechanical system's range of motion. The drive signal may be generated according to a unit step function, a ramp function, or other function that possesses non-zero energy over a broad range of candidate resonant frequencies of the mechanical system. The motor, responsive to the test drive signal, may move the mechanical system and should induce oscillatory behavior therein. The oscillations may induce an electrical signal in the back channel of the motor. The method may capture the back channel signal in the back channel sensor (block 2940). The method may generate data samples from the captured back channel signal (block 2950). From the data samples, the method may calculate the actual resonant frequency of the mechanical system (block 2960). The process may further include storing the calculated resonant frequency in the $f_R$ register (block 2970). The stored resonant frequency may then be used to generate drive signals during run time as discussed in the foregoing embodiments.

Figure 30:
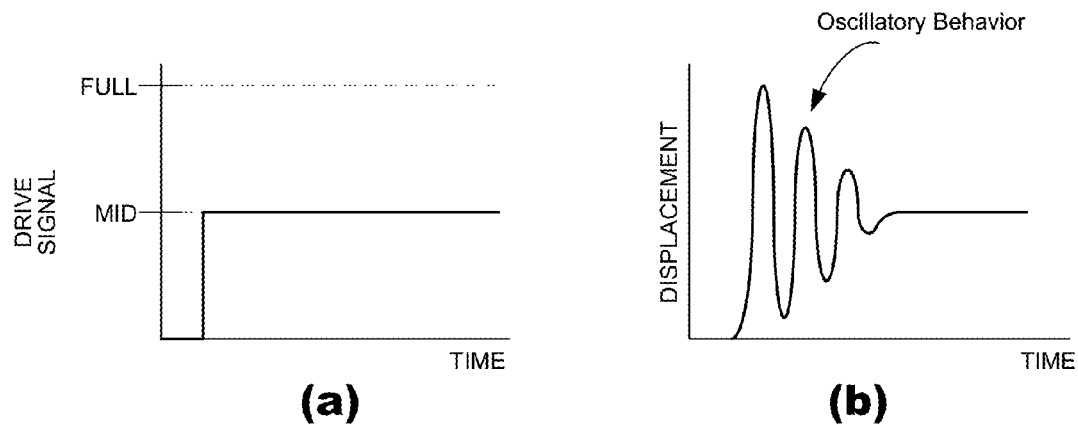
FIGS. 30 (a) and (b) illustrate response of a mechanical system observed under a test drive signal.

FIG. 30 shows an example of a test drive signal in FIG. 30 (a) and the corresponding movement of the mechanical system in FIG. 30 (b). The test drive signal in FIG. 30 (a) is a unit step drive signal that corresponds to the mid-point within the mechanical system's range of movement. The drive signal is applied to the motor, which causes motion in the mechanical system. The displacement of the mechanical system responsive to the mid-point drive signal is shown FIG. 30 (b). The ringing effect is seen in the beginning of the displacement graph where the mechanical system's displacement first acts with an oscillatory behavior before settling to its corresponding displacement value. The oscillatory behavior induces an electrical signal in the back channel with the same resonant frequency as the oscillations in the mechanical system.

Figure 31:
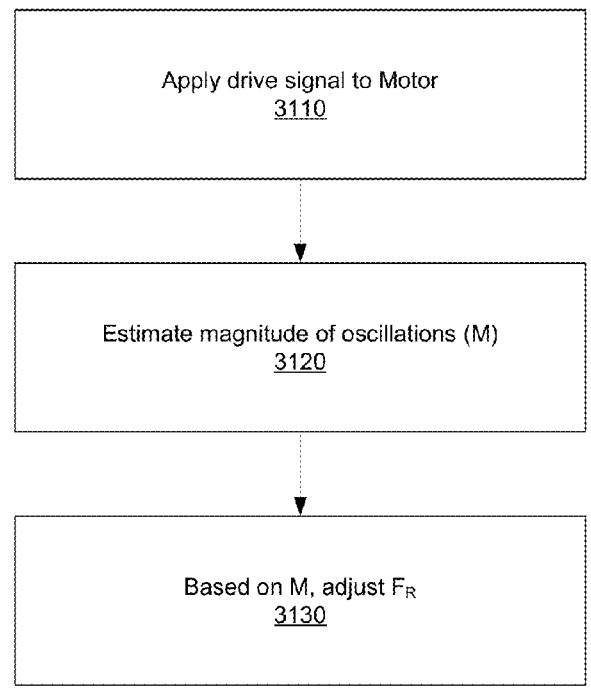
FIG. 31 shows a simplified process flow for updating a resonant frequency.

Resonant frequency may also be calculated in a searching/adaptive process. FIG. 31 is a flow diagram of a method 3100 to adaptively adjust a stored resonant frequency value of the mechanical system according to an embodiment. The method may include applying a drive signal (block 3110). A nominal value for $f_R$ may be stored in a register at this time. The nominal value for $f_R$ may be the last $f_R$ value calculated. The drive signal may be a test drive signal or a drive signal applied in normal operation. If the drive signal is a test drive signal, it may be a unit step drive signal that has a value that is sufficient to drive the mechanical system to an intermediate position within the mechanical system's range of motion. The drive signal may be generated according to a unit step function, a ramp function, or other function that possesses non-zero energy over a broad range of candidate resonant frequencies of the mechanical system. The motor, responsive to the drive signal, may move the mechanical system and should induce oscillatory behavior therein. The method may estimate a magnitude of the oscillations, M (block 3120). According to M, the method may adjust $f_R$ (block 3130). The adjustment may depend on factors such as mechanical system orientation and step size. The method may further include storing the calculated resonant frequency in the $f_R$ register. The stored resonant frequency may then be used to generate drive signals during run time as discussed in the foregoing embodiments.

Figure 32A:
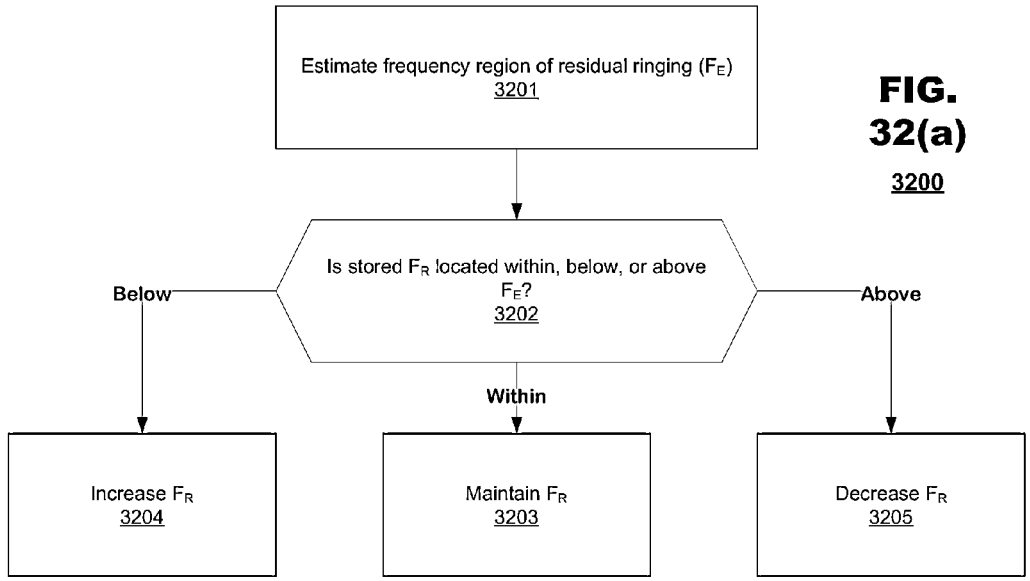
FIG. 32(a) shows a simplified process flow for adjusting a resonant frequency.

FIG. 32(a) is a flow diagram of method 3200 to calculate the $f_R$ adjustment according to an embodiment. The method may include estimating a frequency region of the oscillations, $F_E$ (block 3201). $F_E$ may have a tolerance, such as ±10%; therefore, a precise measurement is not needed. The method may compare the stored $f_R$ and $F_E$, to check whether the stored $f_R$ is located within $F_E$, below $F_E$, or above $F_E$ (block 3202). If the stored $f_R$ is located within $F_E$, the method may maintain the stored $f_R$ (block 3203). If the stored $f_R$ is below $F_E$, the method may increase the stored $f_R$ by a predetermined amount (3204). If the stored $f_R$ is above $F_E$, the method may decrease the stored $f_R$ by a predetermined amount (block 3205). The method may further include storing the adjusted $f_R$ in the $f_R$ register.

Figure 32B:
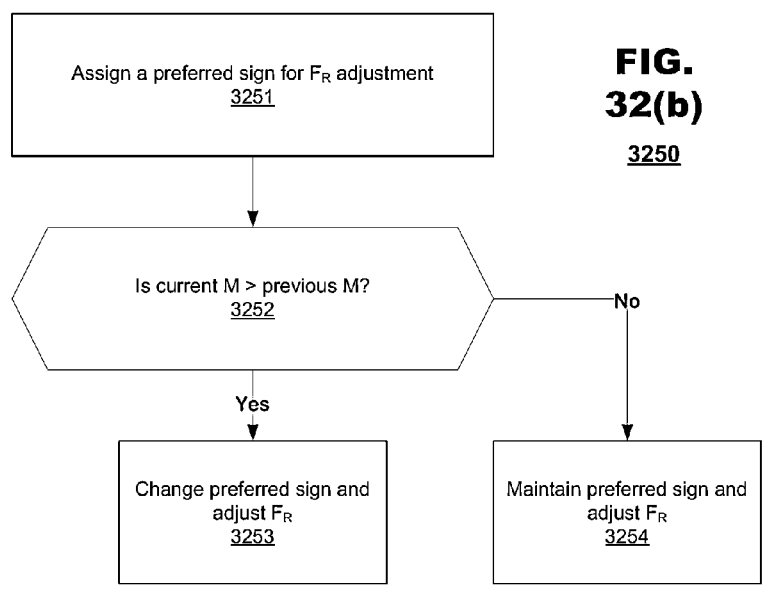
FIG. 32(b) shows a simplified process flow for adjusting a resonant frequency.

FIG. 32(b) is a flow diagram of method 3250 to calculate the $f_R$ adjustment according to another embodiment. The method may include assigning a preferred sign (+ or −) for a $f_R$ adjustment (block 3251). The preferred sign may be assigned based on prior patterns or operation of the mechanical system. The method may detect whether the mechanical system's performance has degraded, by comparing a current oscillation magnitude to a previous oscillation magnitude (block 3252). The oscillation magnitude increasing over time indicates that the performance has degraded. If the current oscillation magnitude is greater than the previous oscillation magnitude, the method may change the preferred sign and adjust $f_R$ a predetermined amount according to the newly assigned sign (block 3253). The method may further store the changed sign as the preferred sign for the next iteration. If the oscillation magnitude is not greater than the previous oscillation magnitude, the method may maintain the preferred sign and adjust $f_R$ a predetermined about according to the preferred sign (block 3254). The predetermined amount changes to $f_R$ may be set to relatively small amounts because large variations in resonant frequency are not expected. Accordingly, method 3250 may track and adjust $f_R$ continuously.

According to an embodiment, the back channel detection system may calculate the $D_{TH}$ required to move the mechanical system from the starting mechanical stop position. Again, system manufacturers often do not know the $D_{TH}$ of their mechanical systems precisely. Moreover, particularly in consumer devices where system components must be made inexpensively, the $D_{TH}$ can vary across different manufacturing lots of a common product. Therefore, the calculation of the mechanical system's actual $D_{TH}$ rather than depending on the manufacturer's expected $D_{TH}$ improves precision in the mechanical system during use.

Figure 33:
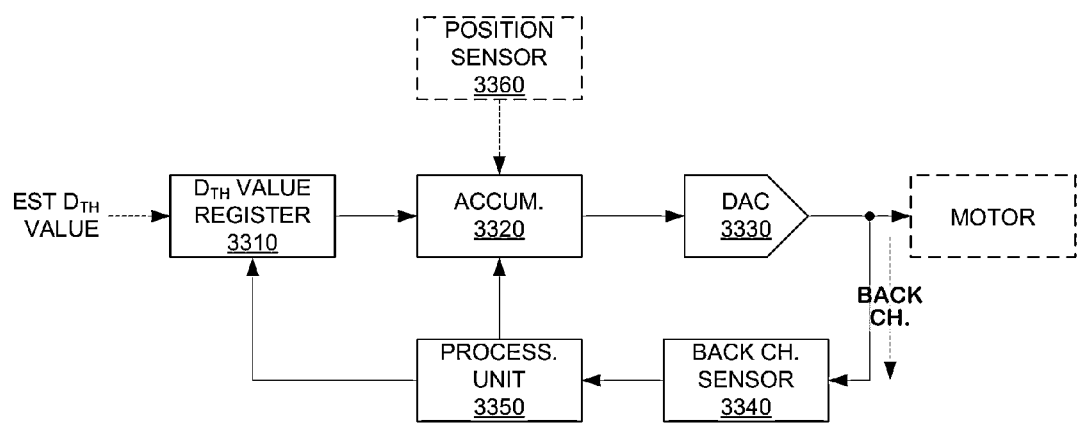
FIG. 33 is a simplified block diagram of a drive signal generator according to another embodiment of the present invention.

FIG. 33 illustrates an embodiment of a drive signal generator 3300 that may be incorporated in a motor driver to calculate the actual $D_{TH}$ of the mechanical system. The drive signal generator 3300 operates in an initialization mode of the motor driver. It may include an accumulator 3320 to generate a digital test drive signal, a digital-to-analog converter (DAC) 3330 to generate an analog test drive output signal based on the accumulator's digital output, which is applied to the motor of the mechanical structure, a back channel sensor 3340 to capture a back channel electrical signal, a processing unit 3350 to calculate the actual $D_{TH}$ value or instruct the accumulator 3320 to generate another digital test drive signal, and a $D_{TH}$ register 3330 to store the calculated $D_{TH}$ value. The analog signal may be generated as current or voltage.

According to an embodiment of the present invention, the drive signal generator may further include a position sensor 3360 to store the position and orientation of the mechanical system. The position sensor 3360 may be coupled to the accumulator 3320. $D_{TH}$ may be sensitive to the mechanical system's orientation. For example, a lens mechanical system may have a lower $D_{TH}$ when facing downwards because gravity's assisting force downwards, and conversely, a lens mechanical system may have a higher $D_{TH}$ when facing upwards because gravity's opposing force downwards. The position sensor 3360 may be an inclinometer, a gyroscope, or any suitable position detection device.

Figure 34:
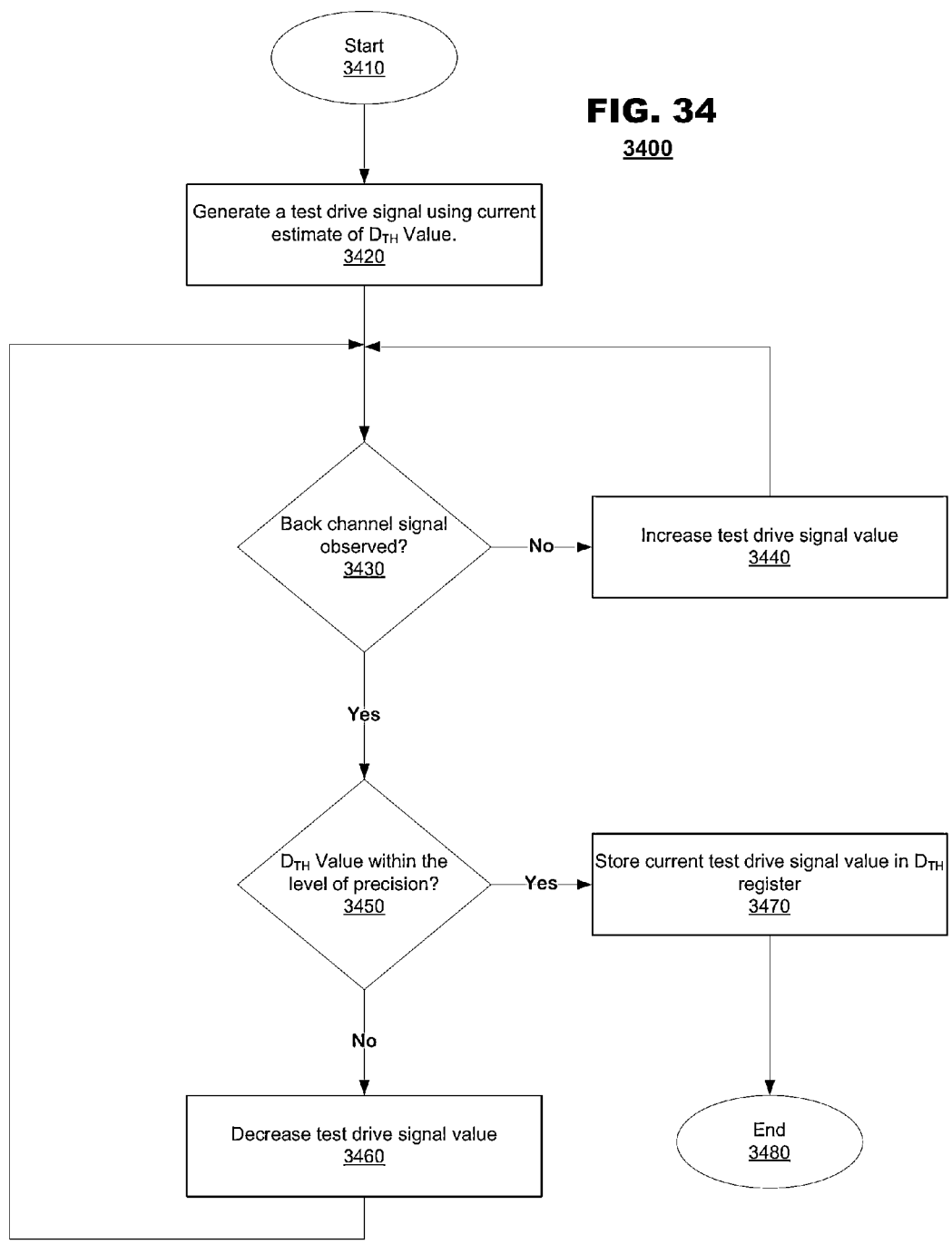
FIG. 34 shows a simplified process flow for determining a threshold voltage.

FIG. 34 is a flow diagram of a method 3400 to determine the $D_{TH}$ of the mechanical system according to an embodiment of the present system. The method 3400 may perform an iterative process to determine $D_{TH}$. The process may generate a test drive signal using a current estimate of $D_{TH}$ stored in the $D_{TH}$ register (block 3420). The test drive signal maybe generated according to a unit step function. In a first iteration, the $D_{TH}$ estimate may be a preprogrammed value but thereafter it may be set by a previous iteration. According to an embodiment, the test drive signal may be generated when a change in orientation is detected. The test drive signal may also be generated according to a detected orientation of the mechanical system. The test drive signal may be applied to the motor of the mechanical system. If the value of the test drive signal is equal to or higher than the actual $D_{TH}$, the motor should move the mechanical system, which produces oscillations in the mechanical system. The oscillations may induce an electrical signal in the back channel. However, if the value of the test drive signal is lower than the actual $D_{TH}$, the mechanical system does not move and, consequently, no back channel signal is induced.

The method 3400 may monitor the back channel for oscillations (block 3430) and determines if a back channel signal is present. If a back channel signal is not observed, the method 3400 increases the test drive signal for another iteration (block 3440). The method may repeat. If the back channel signal is observed, the processing unit checks if the current $D_{TH}$ value is within a predetermined level of precision (block 3450). This check may be done, for example, by determining if the value of $D_{TH}$ has been changed a predetermined number of times in the process. If the current $D_{TH}$ estimate is not within a level of precision, the method decreases the test drive signal (block 3440). The method may repeat.

If the $D_{TH}$ value is known to be within the level of precision, the processing unit stores the current $D_{TH}$ value in the $D_{TH}$ register as a final estimate (block 3470). Thereafter, the method may conclude. The stored $D_{TH}$ value may then be used in any embodiment of the present invention that uses expected $D_{TH}$ value. Additionally, a feedback driven search method may be implemented to improve convergence speed by calculating the amplitude of the unit step functions based on the measured parameters of the back channel responsive to previous drive signals.

Figure 35:
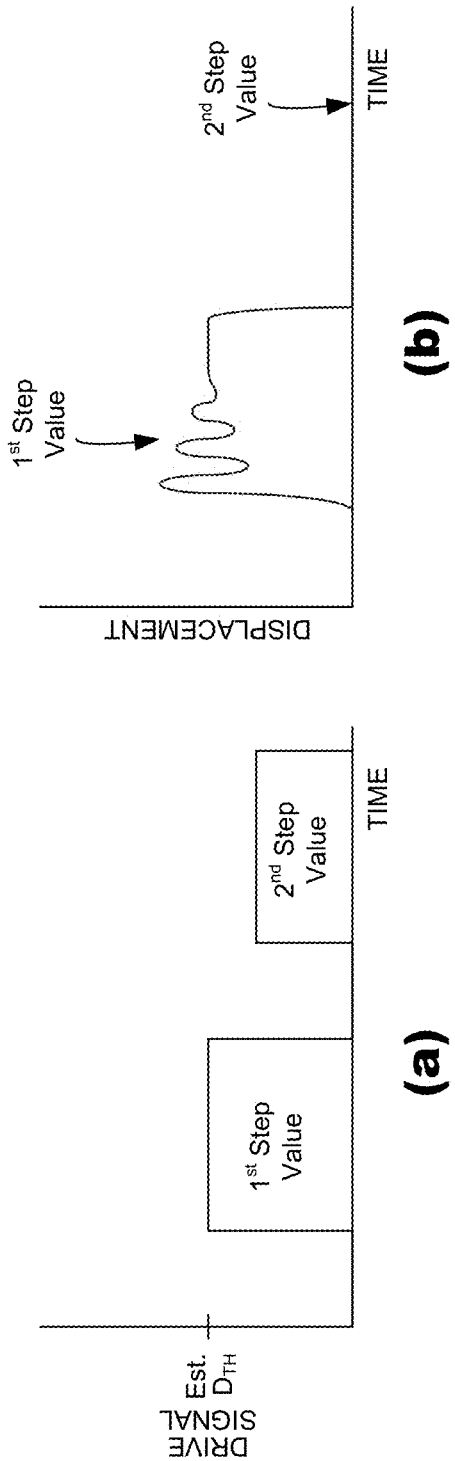
FIGS. 35 (a) and (b) illustrate response of a mechanical system observed under test unit step drive signals.

FIG. 35 shows an example of a test drive signals in FIG. 35 (a) and the corresponding movements of the mechanical system in FIG. 35 (b). The $1^{st}$ Step Value test drive signal in FIG. 35 (a) is a unit step drive signal that corresponds to the estimated $D_{TH}$ value. The drive signal is applied to the motor, which causes motion in the mechanical system. The displacement of the mechanical system responsive to the $1^{st}$ Step Value test drive signal is shown FIG. 35 (b). The ringing effect is seen in the beginning of the displacement graph where the mechanical system's displacement first acts with an oscillatory behavior before settling to its corresponding displacement value. The oscillatory behavior induces an electrical signal in the back channel with the same resonant frequency as the oscillations in the mechanical system. The $2^{nd}$ Step Value test drive signal, which is lower in magnitude than the $1^{st}$ Step Value test drive signal, does not cause the motor to be driven so no movement in the mechanical system hence no oscillatory behavior as shown in FIG. 35. Therefore, the $2^{nd}$ Step Value test drive signal was lower than the actual $D_{TH}$. The process would continue by generating a $3^{rd}$ Step Value (not shown) in between the $1^{st}$ and $2^{nd}$ Step Value and monitoring for oscillatory behavior iteratively until a $D_{TH}$ value is determined within the level of precision.

Both the resonant frequency, $f_R$, and $D_{TH}$ value may be determined in an initialization mode. The initialization mode may be triggered when the mechanical system is first turned on, or every time the mechanical system is turned on, or at other predetermined times. The $f_R$ and $D_{TH}$ value calculating processes may also be performed concurrently or successively in the same initialization mode or in different initialization modes. If both processes are performed concurrently, the same test drive signal may be used for both processes with the processing unit calculating both actual $f_R$ and $D_{TH}$ value using the same back channel signal. If both processes are performed successively, the processes may be performed in either order. Additionally, $D_{TH}$ value may be modified when an orientation change is detected according to a function or look-up-table (LUT).

Several embodiments of the present invention are specifically illustrated and described herein. However, it will be appreciated that modifications and variations of the present invention are covered by the above teachings and within the purview of the appended claims without departing from the spirit and intended scope of the invention. Additionally, it will be appreciated that the signals illustrated above represent idealized forms of drive signals with instantaneous response; in practice, some amount of slew can be expected from a motor driver in actual operating conditions. Such effects have been omitted from the foregoing discussion so as not to obscure the principles of the present invention.

We claim:

1. A method for driving a motor-driven mechanical system using a calculated mechanical system specific resonant frequency, comprising:
applying a test drive signal to a motor of a mechanical system to cause oscillatory behavior in the mechanical system;
capturing a back channel electrical signal induced by the motor from the oscillatory behavior;
calculating a resonant frequency of the mechanical system from the captured electrical signal;
storing the calculated resonant frequency in a register, the resonant frequency to be used in a run time mode; and
applying a drive signal to the motor of the mechanical system in the run time mode, the drive signal having substantially zero energy at the calculated resonant frequency.

2. The method of claim 1, wherein the motor is a lens driver motor.

3. A drive signal generator, comprising:
a test signal generator having an output for connection to a motor of a mechanical system;
a back channel sensor to capture an electrical signal induced by the motor from oscillatory behavior in the mechanical system;
a processor to calculate a resonant frequency of the mechanical system from the captured electrical signal;
a register to store the calculated resonant frequency; and
an accumulator to generate a drive signal in a run time operation mode, the drive signal having substantially zero energy at the stored resonant frequency.

4. The drive signal generator of claim 3, further comprising a digital to analog converter to generate an analog representation of the test drive signal.

5. A system comprising;
a mechanical structure having a drive motor;
a drive signal generator coupled to the drive motor, comprising:
an initialization circuit, operable in an initialization mode to generate a test drive signal to cause oscillatory behavior in the mechanical structure;
a back channel sensor to capture an electrical signal induced by the motor from the oscillatory behavior;
a processing unit to calculate a resonant frequency of the mechanical structure from the captured electrical signal;
a register to store the calculated resonant frequency; and
a drive circuit which generates a drive signal in a run time mode having substantially zero energy at the stored resonant frequency.

6. The system of claim 5, wherein the drive signal generator further comprising a digital to analog converter to generate an analog representation of the test drive signal.

7. A system comprising:
a mechanical structure having a drive motor; and
a back channel detection system, comprising:
an initialization circuit, operable in an initialization mode to applying a test drive signal to the drive motor;
a back channel sensor to monitor a signal line from the drive motor for an electrical signal induced by the drive motor due to movement of the mechanical structure;
a processing unit to calculate a characteristic value of the mechanical structure from the monitored back channel electrical signal;
a register to store the calculated characteristic value; and
a drive circuit, which generates a drive signal in a run time mode based on the calculated characteristic value, at least in part, which mitigates undesired harmonic movement of the mechanical structure.

8. A method for driving a motor-driven mechanical system, comprising:
applying a first drive signal to a motor of a mechanical system to cause oscillatory behavior in the mechanical system;
capturing a magnitude estimate of the oscillatory behavior;
adjusting a resonant frequency of the mechanical system based on the magnitude estimate;
storing the adjusted resonant frequency in a register; and
applying a second drive signal which has substantially zero frequency components at or around the adjusted resonant frequency.

9. The method of claim 8 wherein the first drive signal is a test drive signal.

10. The method of claim 8 wherein the second drive signal is a normal operation drive signal.

11. A drive signal generator, comprising:
a driver circuit to generate a drive signal to be applied to a motor;
a feedback circuit to capture oscillations caused by the motor due to movement of a mechanical system;
a processor to adjust a resonant frequency according to the captured oscillations;
a register to store the resonant frequency; and
a drive circuit which generates a drive signal in a run time mode having substantially zero energy at the stored resonant frequency.

12. The method of claim 1 whereby the drive signal parks the mechanical system at a designated position with substantially no oscillation.

13. The method of claim 1, further comprising, responsive to a codeword that identifies a destination position of the mechanical system, determining an amplitude of the drive signal having components representing: a) a start position of the mechanical system and b) a difference between the start position and the destination position, wherein a step size is determined from the difference component.

14. The method of claim 1 further comprising, when a start position of the mechanical system is a rest position, determining an amplitude of the drive signal having a) a first component corresponding to a drive signal level required to move the mechanical system from the rest position and b) a differential component corresponding to a difference between the first component and a drive signal level required to move the mechanical system to the destination position, wherein a step size is determined from the difference component, and wherein the first component is applied in the first step of the drive signal.

15. The method of claim 1, wherein an amplitude of the steps is determined from a codeword generated by an image processing system and the drive signal is applied to a lens drive motor.

16. The method of claim 1, wherein an amplitude of steps is determined from a codeword is generated by a touch panel controller and the drive signal is applied to a haptic effect motor coupled to a touch panel.

17. The method of claim 1, wherein an amplitude of steps is determined from a codeword is generated by a disk controller and the drive signal is applied to a swing arm-based disk reader.

18. The method of claim 1, wherein an amplitude of steps is determined from a codeword is generated by a disk controller and the drive signal is applied to a sled-based disk reader.

19. The drive signal generator of claim 3, wherein the motor is a lens driver motor.

20. The drive signal generator of claim 3, wherein the motor is a voice coil motor.

21. The drive signal generator of claim 3, wherein the motor is a step motor.

22. The drive signal generator of claim 4, wherein the digital to analog converter generates an analog voltage.

23. The drive signal generator of claim 4, wherein the digital to analog converter generates an analog current.

24. The system of claim 5, further comprising a filter which is applied to the drive signal.

25. The system of claim 24, wherein the filtered drive signal is applied to a lens drive motor.

26. The system of claim 24, wherein the filter comprises a plurality of notch filters each have a notch at substantially the same frequency.

27. The system of claim 26, wherein at least two of the plurality of notch filters have respective notches at different frequencies around the expected resonant frequency.

28. The system of claim 7, wherein the drive circuit further comprising a position sensor to detect the mechanical structure's orientation.

29. The system of claim 7, wherein the drive circuit further comprising a digital to analog converter to generate an analog representation of the test drive signal.

30. The system of claim 7, wherein the motor is a lens driver motor.

31. The system of claim 7, wherein the motor is a voice-coil motor.

32. The system of claim 7, wherein the motor is a stepper motor.

33. The system of claim 7, wherein the mechanical structure remains in a default position in the absence of the drive signal and moves to the destination position when the drive signal is applied.

34. The system of claim 7, wherein the mechanical structure is a lens system having a multi-dimensional range of motion, an image signal processor generates codewords corresponding to each dimension and the method generates multiple drive signals, one corresponding to each of the codewords.

35. The method of claim 10, whereby the drive signal parks the mechanical system at a designated position with substantially no oscillation.

36. The method of claim 8, further comprising, responsive to a codeword that identifies a destination position of the mechanical system, determining an amplitude of the drive signal having components representing: a) a start position of the mechanical system and b) a difference between the start position and the destination position, wherein a step size is determined from the difference component.

37. The method of claim 10 further comprising, when a start position of the mechanical system is a rest position, determining an amplitude of the drive signal having a) a first component corresponding to a drive signal level required to move the mechanical system from the rest position and b) a differential component corresponding to a difference between the first component and a drive signal level required to move the mechanical system to the destination position, wherein a step size is determined from the difference component, and wherein the first component is applied in the first step of the drive signal.

38. The method of claim 8, wherein an amplitude of the steps is determined from a codeword generated by an image processing system and the drive signal is applied to a lens drive motor.

39. The method of claim 8, wherein an amplitude of steps is determined from a codeword is generated by a touch panel controller and the drive signal is applied to a haptic effect motor coupled to a touch panel.

40. The method of claim 8, wherein an amplitude of steps is determined from a codeword is generated by a disk controller and the drive signal is applied to a swing arm-based disk reader.

41. The drive signal generator of claim 11, further comprising a digital to analog converter to generate an analog representation of the test drive signal.

42. The drive signal generator of claim 41, wherein the digital to analog converter generates an analog voltage.

43. The drive signal generator of claim 41, wherein the digital to analog converter generates an analog current.

44. The drive signal generator of claim 11, wherein the motor is a lens driver motor.

45. The drive signal generator of claim 11, wherein the motor is a voice coil motor.

46. The drive signal generator of claim 11, wherein the motor is a step motor.

47. The drive signal generator of claim 44, further comprising a filter which is applied to the drive signal.

48. The drive signal generator of claim 47, wherein the filtered drive signal is applied to the lens drive motor.

49. The system of claim 47, wherein the filter comprises a plurality of notch filters each have a notch at substantially the same frequency.

50. The system of claim 49, wherein at least two of the plurality of notch filters have respective notches at different frequencies around the expected resonant frequency.

* * * * *